Dec. 19, 1961 J. B. WIENER 3,013,658
CARD PROCESSING SYSTEM
Filed Sept. 19, 1957 7 Sheets-Sheet 1

INVENTOR:
Jerome B. Wiener
By Smyth & Roston
Attorneys

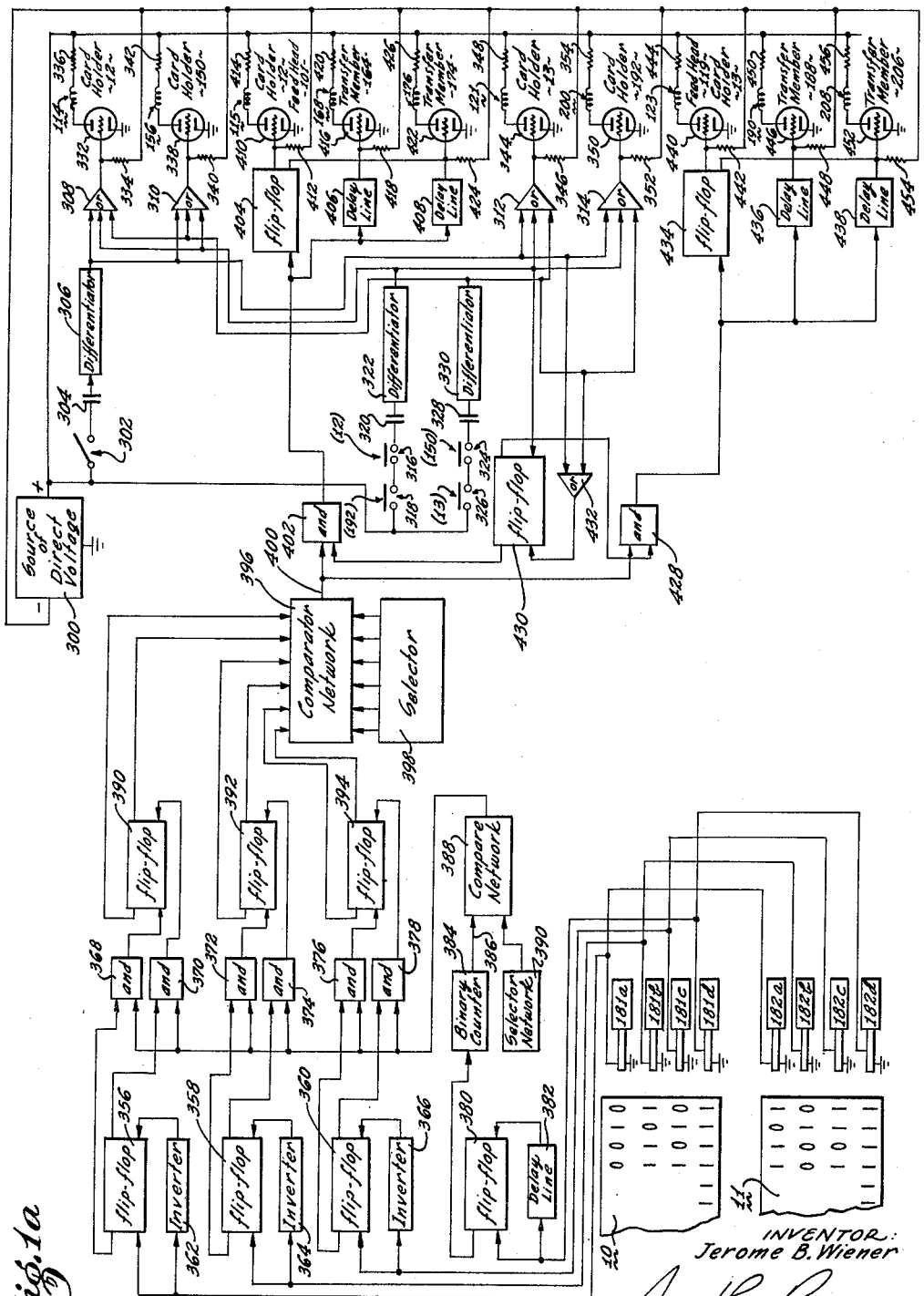

Dec. 19, 1961   J. B. WIENER   3,013,658
CARD PROCESSING SYSTEM
Filed Sept. 19, 1957   7 Sheets-Sheet 3

INVENTOR:
Jerome B. Wiener
Smyth & Roston
Attorneys

Dec. 19, 1961 J. B. WIENER 3,013,658
CARD PROCESSING SYSTEM
Filed Sept. 19, 1957 7 Sheets-Sheet 4
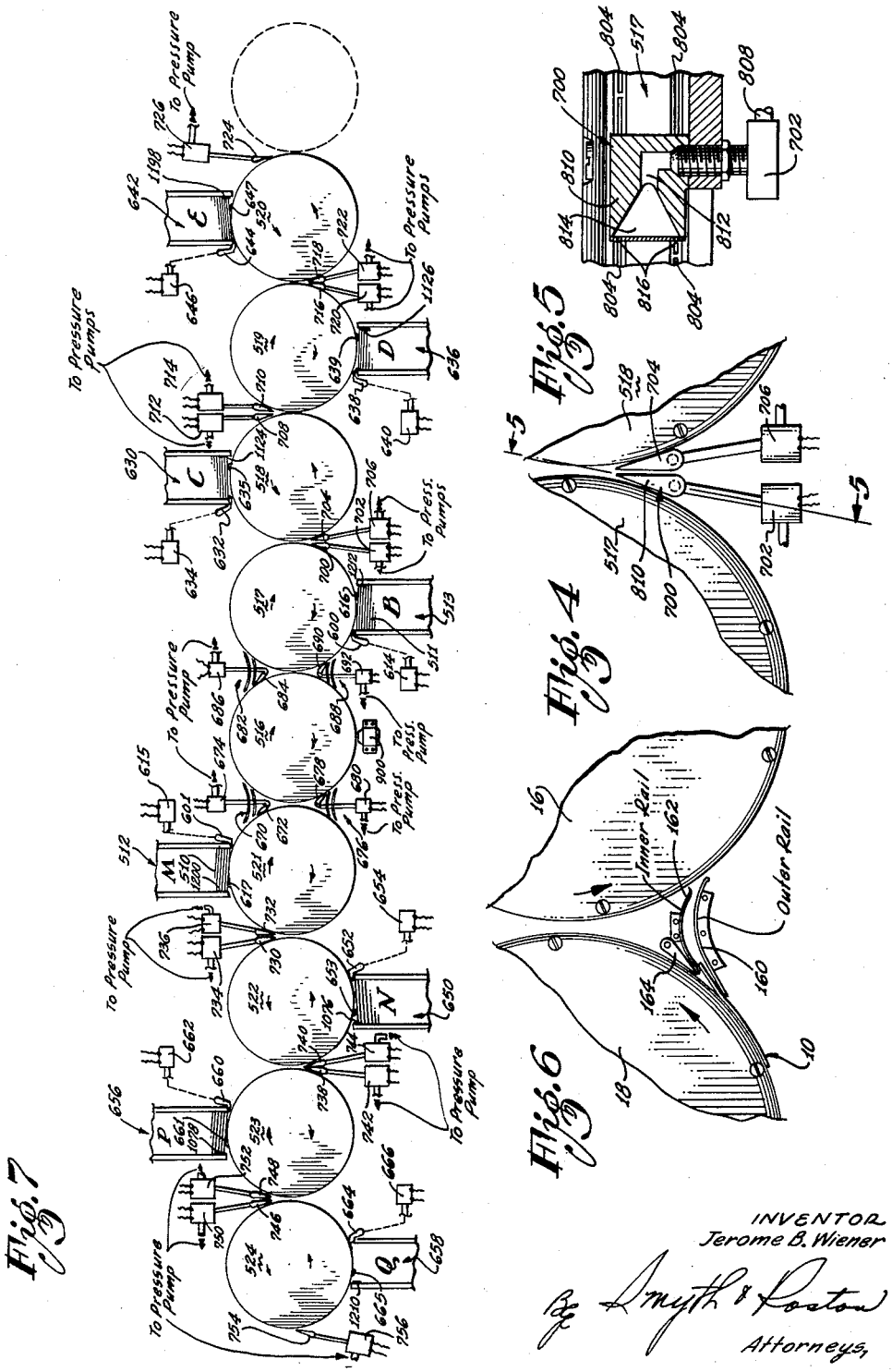
INVENTOR
Jerome B. Wiener
Attorneys

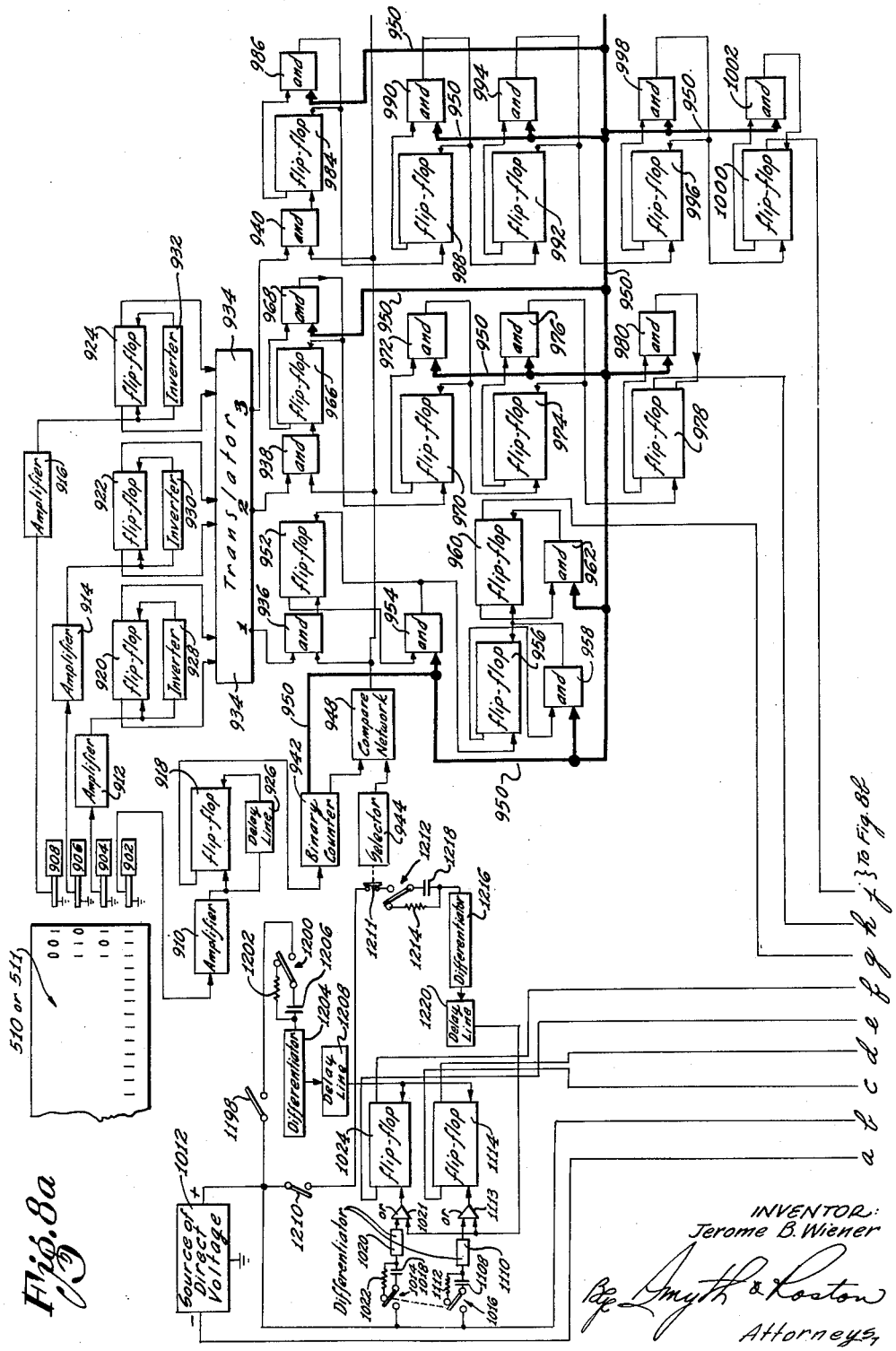

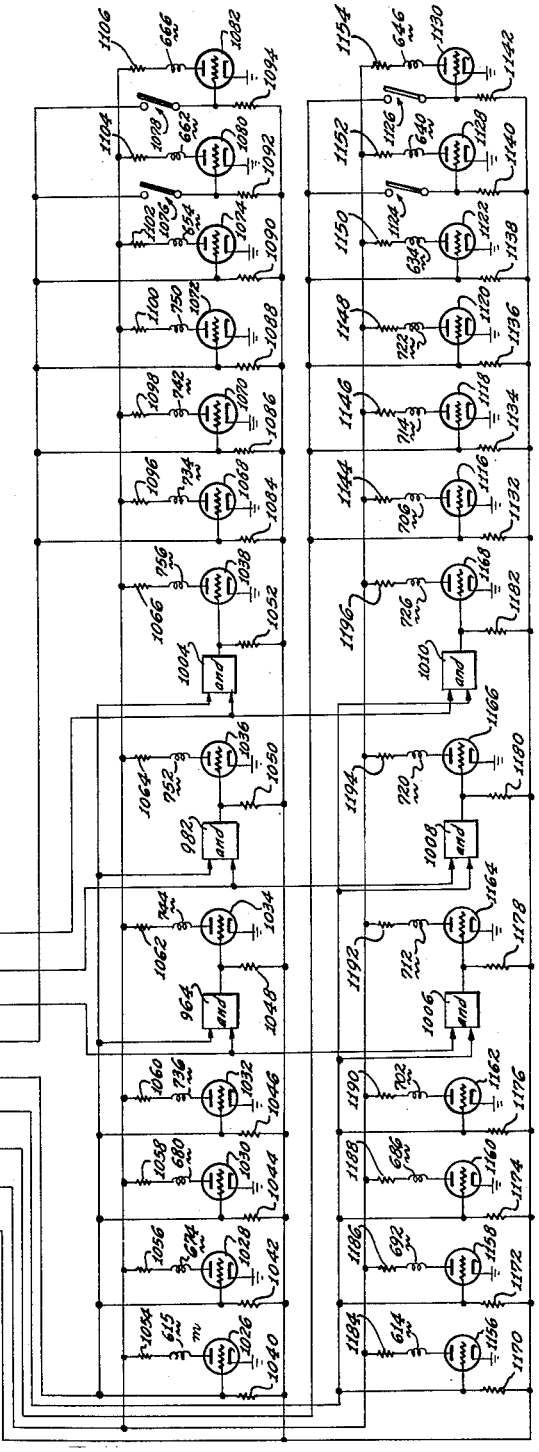

Dec. 19, 1961  J. B. WIENER  3,013,658
CARD PROCESSING SYSTEM
Filed Sept. 19, 1957  7 Sheets-Sheet 7

INVENTOR:
Jerome B. Wiener

Smyth & Roston
Attorneys

United States Patent Office 3,013,658
Patented Dec. 19, 1961

3,013,658
CARD PROCESSING SYSTEM
Jerome B. Wiener, Granada Hills, Calif., assignor to The Magnavox Company, Los Angeles, Calif., a corporation of Delaware
Filed Sept. 19, 1957, Ser. No. 685,041
22 Claims. (Cl. 209—72)

The present invention relates to data processing apparatus and systems, and more particularly to an improved system for handling information storage cards in a logical sequence in order to render them suitable and to simplify subsequent processing.

Data processing systems have become increasingly prevalent in recent years and many significant advances have been made in this art. These systems for the most part make use of discrete information storage cards in which pertinent data is recorded in digital form by one technique or another.

This digital information, for example, may be recorded on the individual cards in the form of patterns of punched holes, in the form of magnetized areas of north or south polarity, or in any other suitable form. The system of the present invention will be described in conjunction with information storage cards on which the information is recorded as a multiplicity of dots of one magnetic polarity or the other, the particular magnetic polarity depending upon whether a particular bit of information is to represent a "1" or a "0." It will be apparent, however, as the description proceeds that other types of information cards may be handled by the system merely by modifying the transducer means which is used in the system. It will also become apparent that the coding on the cards needs not necessarily be digital. For example, actual characters can be imprinted on the cards as used in character recognition systems. These characters can be imprinted in magnetic ink for recognition by electro-magnetic pick-up or read heads.

Due to the complexity of present day business organizations and the like, data processing systems serving such organizations often entail the use of hundreds of thousands of information storage cards. This means that millions of bits of different digital information are often required in modern data processing systems. A pressing problem that has arisen has been to devise suitable systems for handling the cards rapidly, efficiently and with a minimum of equipment.

The present invention provides an adequate solution for the problem referred to above. The system is capable of handling a large number of information storage cards in accordance with the digital information on the cards. A feature of the invention is the fact that it possesses multiple characteristics in that it is capable of individually handling two or more separate stacks of information cards essentially simultaneously. The operation is such that the cards in each of the two stacks are simultaneously processed with respect to the digital information recorded on the cards in each of the stacks.

The system of the invention performs its dual function by the use of suitable transport means such as individual rotatable vacuum transporting drums for the cards of the two stacks, and by the use of a common transporting drum on which the cards of both stacks are transported on a time-sharing basis. A common transducer means is used to process the cards from both the stacks.

In the manner described briefly above, and as will be described subsequently in detail, the system of the invention is capable of effectively doubling the capacity of card-sorting systems of this general type and with many components serving a common purpose. It is evident therefore that the efficiency of the card processing is materially increased by the system and apparatus of the invention.

In the specific embodiment of the invention, the time-sharing technique and the use of a common transporting drum is applied in a particular system to a mechanism for sorting the information cards. Because the number of cards may run into the hundreds of thousands in the more complex systems with the corresponding bits of distinct digital information running into the millions, it is obvious that a rapid and efficient means for sorting the cards in accordance with the recorded data is extremely important. In accordance with the specific sorting embodiment of the invention, the cards in each of two separate input stacks are simultaneously and independently sorted with respect to the digital information recorded on the cards.

The system of the invention also incorporates other features. For example, the entire sorting process is carried out by means of pneumatically controlled gates and transfer mechanisms which reduce the mechanical moving parts of the system to a minimum and enable extremely high speed operation to be achieved.

In the drawings:

FIGURE 1a is a circuit diagram of a suitable control system for the apparatus and system of FIGURE 1;

FIGURE 4 is a fragmentary top plan view of a pair of adjacent drums which are included in the system of FIGURE 1, and this view particularly illustrates a pair of pneumatically operated gates associated with these drums and which are controllable to transfer the information storage cards from one of the drums to the other and to return the cards to the first drum;

FIGURE 5 is a sectional view taken along the line 5—5 of FIGURE 4 to show the constructional details of the gates used in the gate transfer mechanism of FIGURE 4;

FIGURE 6 is a fragmentary top plan view of another pair of adjacent transporting drums included in the system of FIGURE 1, and this view particularly illustrates a gate transfer mechanism disposed between such drums which is capable of transferring information cards from one of the drums to the other;

Figure 9:
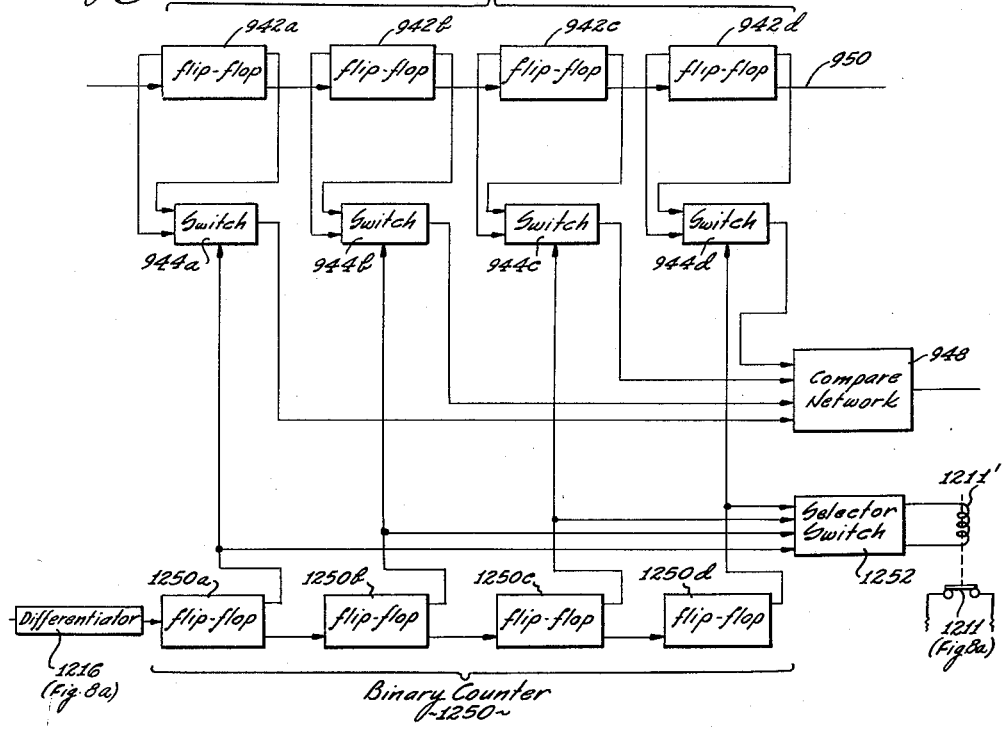
Figure 10:
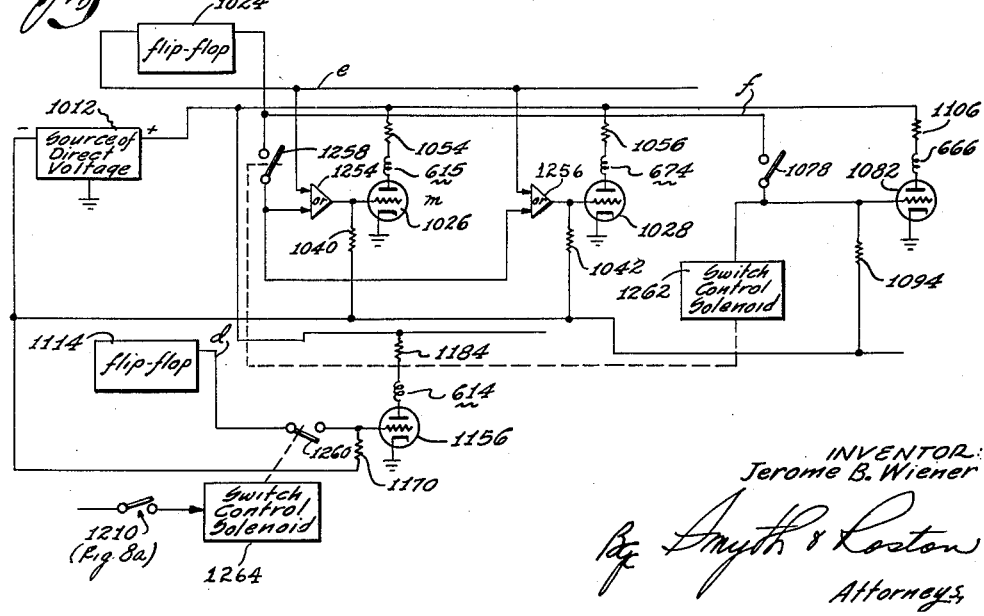

FIGURE 7 is a top plan view of a sorting apparatus and system constituting a particular embodiment of the invention, the illustrated system including a plurality of rotatable vacuum transporting drums and a corresponding plurality of gates associated with the drums for controlling the transfer of information storage cards from one drum to another, and the system also including a series of holders for the information cards and their associated transfer mechanisms;

FIGURES 8a and 8b are schematic representations of an electric control system for the apparatus and system of FIGURE 7 which enables that apparatus and system effectively to sort the information storage cards from a pair of separate card holders independently and on an essentially simultaneous basis;

FIGURE 9 is a block diagram schematically illustrating an automatic control for one of the components of the system of FIGURE 8a; and FIGURE 10 is a control system for permitting the apparatus of FIGURE 7 to be used in a modified manner.

Figure 1:
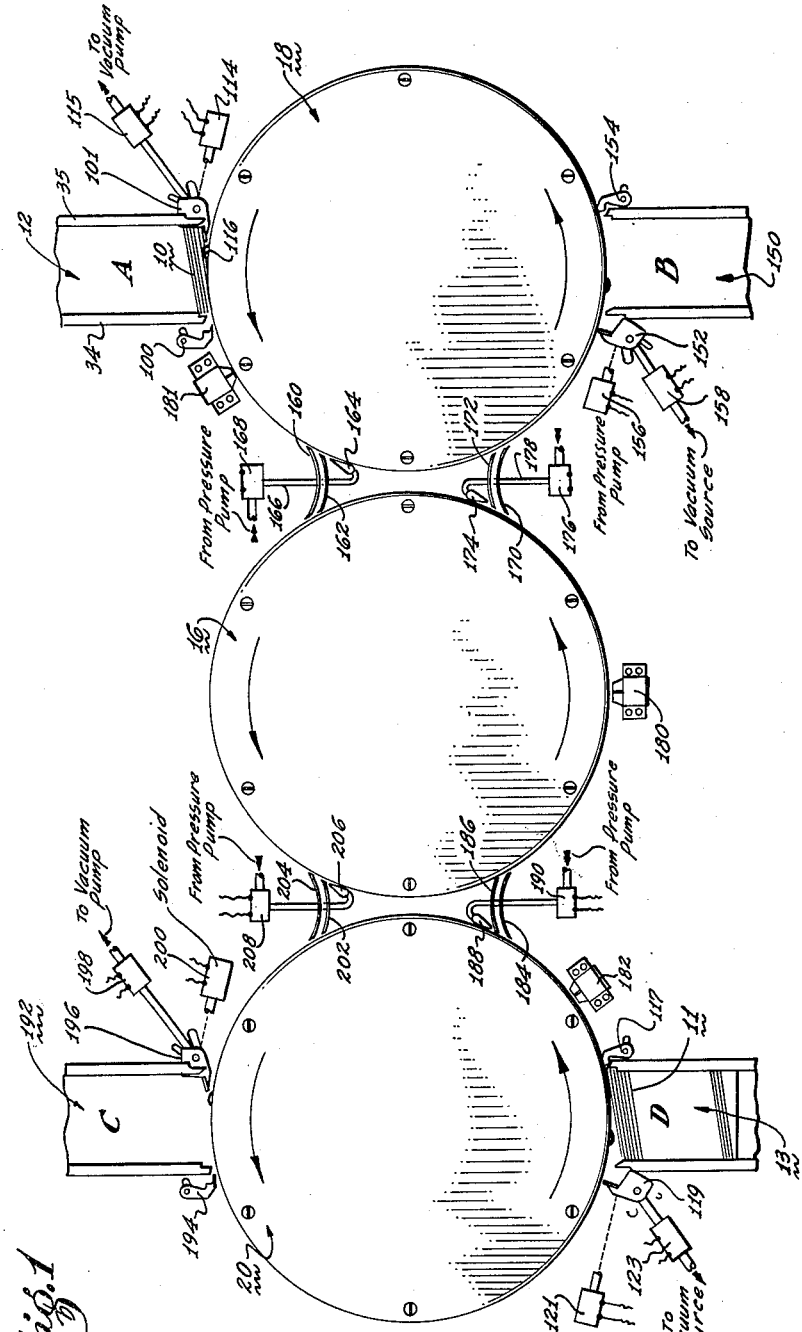
FIGURE 1 is illustrative of a typical system utilizing the time sharing principles of the invention, this figure being a top plan view in somewhat schematic form of a card processing system in which the cards from two separate and distinct stacks may be simultaneously and independently processed.

In the embodiment of the invention shown in FIGURE 1, a plurality of cards 10 are arranged in stacked relationship in a card holder 12. The bottom edge of each of the cards in the card holder 12 is adapted to rest on a flat surface such as the top of a table which forms the common surface for the apparatus. The faces of each card 10 are disposed in a substantially vertical plane extending in a lateral direction across the top of the table.

A second stack of cards 11 is disposed in a second card holder 13. The cards 11 are similarly supported in the card holder 13 so that their respective bottom edges rest on the top of the common surface and so that their faces are disposed in respective vertical planes. The card holders 12 and 13 may each be adapted to receive stacks of cards from associated adjustable files, as taught in copending application Serial No. 645,640, now Patent No. 2,965,291, filed March 12, 1957, for Robert M. Hayes, et al.

Each of the cards 10 and 11 has a plurality of bits of information recorded on one or both of its surfaces. Each bit of information by itself or in combination with other bits represents information in digital form. This information may relate to numbers, alphabetic letters, combinations of numbers and letters (alpha-numeric coding) or any other pertinent matter.

As previously noted, the digital or character information may be represented on the cards in magnetic form. In this form, as also previously mentioned, when digital coding is used magnetic fluxes of one polarity may represent an indication of "0" or a "false" state, and magnetic fluxes of the opposite polarity may represent an indication of "1" or a "true" state.

Either one face of each card 10 may be magnetically polarized at the different information positions to represent various bits of binary information, or both faces may be magnetically polarized in this manner. By polarizing both faces of each card, the number of cards required to store a particular amount of information can be substantially halved. The information on one side of the card will not interfere with the information on the other side if the card is made sufficiently thick.

A plurality of suitable transport means are mounted on the common surface and are disposed adjacent to one another and to the card holders 12 and 13. The transport means are movable in a closed loop and may be rotatable vacuum pressure transporting drums or other means such as endless belts. For purposes of illustration, three drums 16, 18 and 20 are shown in FIGURE 1. The drum 16 constitutes the central drum, with the drum 18 being mounted on one side of the drum 16 in adjacent relationship, and with the drum 20 being mounted on the other side of the drum 16 in adjacent relationship. The card holder 12 is mounted with its mouth adjacent the drum 18 so that the cards 10 supported in that holder may be fed to the periphery of that drum. The card holder 13, on the other hand, is disposed adjacent the drum 20 so that its cards 11 may be fed to the periphery of that drum.

As previously noted, all the vacuum transporting drums are mounted on a common surface constituted for example by a table top 31. The drums may have a similar construction and, for this reason, the construction of the drum 18 only is shown in detail in FIGURE 3. Likewise, the transfer mechanism associated with the card holder 12 may be similar to the transfer mechanism associated with the card holder 13. Therefore, only the transfer mechanism associated with the card holder 12 is shown in FIGURE 2.

Figure 2:
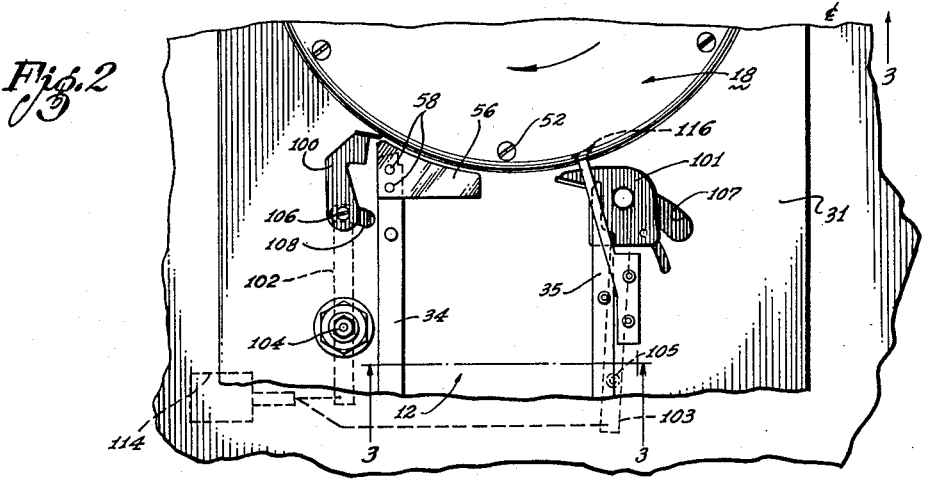
FIGURE 2 is an enlarged fragmentary top plan view of one of the drums of FIGURE 1, particularly showing a reversible card feeding-stacking station associated with that drum.

With particular reference to FIGURE 2, the card holder 12 there illustrated is formed by a pair of parallel walls 34 and 35 which extend along the common surface of the supporting table top. The walls 34 and 35 and the common surface are disposed so that the cards 10 may be held substantially vertical and in stacked condition, and with the leading card in essentially tangential relation with the periphery of the rotatable drum 18. The cards extend between the walls 34 and 35 and are held endwise with their lower edges resting on the table top 31. As will be described in detail subsequently, the drum 18 is positioned to be able to withdraw the cards from the card holder 12 for movement on its periphery.

Figure 3:
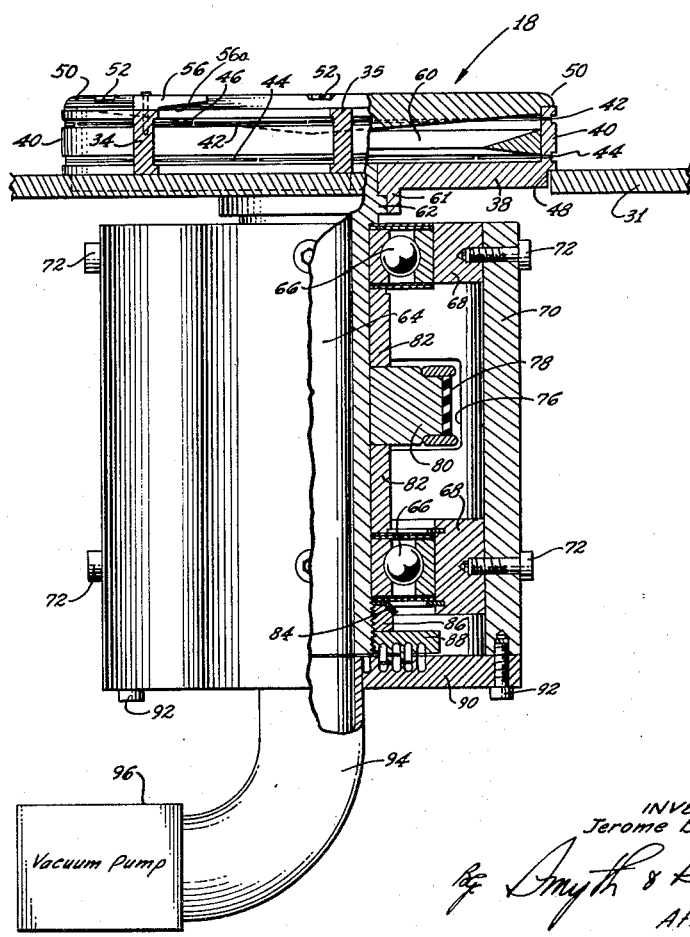
FIGURE 3 is a view partly in section taken substantially along the line 3—3 of FIGURE 2 and particularly showing the constructional details of the vacuum transporting drum illustrated in FIGURE 2.

The drum 18, as shown in FIGURE 3, is similar to the mechanism disclosed and claimed in copending application Ser. No. 600,975, now Patent No. 2,883,189, filed July 30, 1956, for Loren R. Wilson. The drum 18 is made up of a lower section and an upper section. The lower section of the drum includes a disk-like bottom portion 38 and an integral, annular side portion 40. A pair of axially spaced peripheral slots or orifices 42 and 44 extend through the side portion 20. Each of the peripheral orifices is discontinuous in that it is interrupted at selected intervals about its periphery by ribs 46 integral with the side portions 40. The integral ribs 46 interrupting the orifice 42 are staggered with respect to the ribs interrupting the orifice 44. This staggering of the ribs is so that the orifices will not weaken the integral characteristics of the side portion 40 any more than is necessary.

The disk-like bottom portion 38 of the lower section is undercut as shown at 48 so that the bottom of this portion will have a reduced diameter with respect to the outer diameter of the annular side portion 40. This enables the table top 31 to extend beyond the outer limits of the side portion 40, so that the portion 40 overlaps the table top in the manner shown. Therefore, even without excessively close tolerances between the edge of the table top and the rotating surface of the drum 18, the cards 10 supported endwise on the table top in the holder 12 have no tendency to slip down between the table and the drum and become misplaced and damaged.

The upper section of the drum 18 is in the form of a disk-like member 50 which engages the annular side member 40 of the lower section. The upper section 50 forms an enclosure with the lower section of the drum, with the upper section parallel to the disk-shaped bottom portion 48 of the lower section. The upper section 50 is held in place on the side portion 40 by a series of screws 52.

When one of the cards 10 is fed from the stack 12 to the drum 18, it is held on the outer peripheral surface of the annular side portion 40 by vacuum pressure, as will be described. To assure the proper orientation of the cards on this peripheral surface, a guide member 56 is mounted on the end of the wall 34 adjacent the drum 18 by suitable set screws 58. The guide member 56 has a bottom surface which extends downwardly in a direction towards the drum 18 with progressive annular positions along the drum as indicated at 56a in FIGURE 2. The surface 56a acts to position the cards in a vertical direction on the periphery of the drum 18 so that the information on the cards can be properly read by transducers disposed in contiguous relationship to the periphery of the drum, as will be described subsequently.

A deflector ring 60 is supported within the interior of the drum 18 in press-fit with the inner surface of the annular side portion 40. This deflector ring is tapered toward the center of the drum to prevent turbulence and provide a streamlined path for air that is drawn in through the annular orifices 42 and 44. In addition, the under surface of the upper section 50 is bulged to have a convex shape. This convex shape also aids in providing a smooth path for the air that is drawn in through the orifices 42 and 44.

The portion 38 of the lower section of the drum 18 contains a central opening which is surrounded by an annular collar 61. The collar 61, in turn, surrounds a collar 62 provided at one end of a hollow shaft 64. The drum 18 is supported on a shoulder formed by the collar 62, and the end of the shaft 64 extends into the opening of the portion 38 in friction-fit with that portion. Therefore, rotation of the hollow shaft 64 causes the drum 18 to rotate. Also, the interior of the shaft 64 communicates with the interior of the drum.

Bearings 66 are provided at opposite ends of the shaft 64. The inner races of the bearings 66 are mounted on the shaft 64 and the outer races of the bearings are disposed against bushings 68. The bushings 68 are secured to a housing 70 by studs 72.

An arcuate opening 76 is provided in the housing 70 between the bearings 66. This opening enables a drive belt 78 to extend into the housing and around a pulley 80. The pulley 80 is mounted on the shaft 64 between the bearings 66, and the pulley is held against axial movement by the sleeves 82. In this way, the shaft 64 and the drum 18 can be rotated by a suitable motor (not shown) coupled to the pulley 80 by the drive belt 78.

The bearings 66 and the sleeves 82 are held on the shaft 64 by a nut 86. The nut 86 is screwed on a threaded portion at the bottom of the shaft, and a lock washer 84 is interposed between it and the lower bearing. A sealing disk 88 is also screwed on the threaded portion at the bottom of the shaft 64. This sealing disk 88 operates in conjunction with a bottom plate 70 to inhibit the movement of air between the interior of the housing 70 and the interior of the hollow shaft 64 when a difference of pressure exists between the housing and the shaft.

The bottom plate 90 is secured to the housing 70 by studs 92, and it has a central circular opening. A hollow conduit 94 extends into the opening in friction-fit with the plate 90. The conduit 94 is axially aligned with the hollow shaft 64 so that air may be exhausted from the hollow interiors of the shaft and the conduit by a vacuum pump 96. The vacuum pump may be of any suitable known construction and, for that reason, is shown merely in block form.

A vacuum pump 96 draws air in through the orifices 42 and 44 and through the interior of the drum 18 down the shaft 64 and through the conduit 94. This creates a vacuum pressure at the outer periphery surface of the annular portion 40 of the lower section of the drum 18. The deflector ring 60 and the convex under side of the disk-like upper section 50 assures that the air will flow smoothly and with a minimum of turbulence. This assures that a high and adequate vacuum pressure around the outer surface of the annular side portion 40 will be created to firmly retain the cards 10 on that surface.

The cards 10 are retained within the card holder 12 by a suitable control mechanism. The particular control mechanism illustrated in FIGURE 2 is similar to that disclosed in copending application Ser. No. 645,639, now Patent No. 2,969,979, filed March 12, 1957, in the names of Alfred M. Nelson and Allan Orner. This mechanism has a stacking operating mode in which cards transported on the periphery of the drum 18 are deposited in the holder 12, and it has a feeding operating mode in which cards in the holder 12 are controllably fed in succession to the periphery of the drum 18.

The trailing wall 34 of the stack 12 has its forward end extended to a point adjacent the periphery of the drum 18 to define a "mouth" with the drum. This mouth has a transverse dimension corresponding to the thickness of one of the cards 10 normally supported in the holder 12, and it provides that the cards in the holder 12 will be fed in a one-by-one sequence through it to the periphery of the drum 18 when the transfer mechanism is in its feeding operational mode.

The control mechanism of the assembly shown in FIGURE 2 includes a stack head 100 which is mounted on the end of a lever 102, the lever being positioned on the under side of the table top 31 and pivotally mounted on a pivot shaft 104. The stack head 100 is supported on one end of the lever 102 by a stud 106. This stud extends upwardly from the lever 102 through an arcuate slot 108 in the table top.

The stack head 100 is shaped and positioned so that when the lever 102 is pivoted in a clockwise direction and the stack head moves to the right of the slot 108 in FIGURE 2, the stack head is adapted to close the mouth defined by the end of the wall 34 of the card holder and the periphery of the drum 18.

The control mechanism of the assembly shown in FIGURE 2 also includes a feed head 101 which is positioned adjacent the end of the leading wall 35 of the card holder 12. The feed head may be constructed in the manner described in detail in the copending application Ser. No. 645,639, now Patent No. 2,969,979, referred to previously. The feed head is mounted on the end of a lever arm 103, the lever arm being pivoted to the under side of the table top 31 by means of a shaft 105. Movement of the lever 103 about the axis of the shaft 105 causes the feed head 101 to move in an arcuate slot 107 in the table top.

The feed head 101 is movable from a standby position forward into the space between the end of the wall 35 and the periphery of the drum 16 to an operative position. When the feed head is in an operative position, it presents a supporting surface to the trailing face of the leading card in the card holder 12.

In a manner fully described in the copending application Ser. No. 645,639, now Patent No. 2,969,979, a vacuum pressure is controllably provided at the face of the feed head 101. This vacuum pressure is such that it has sufficient strength to restrain the cards 10 in the card holder 12 against the vacuum pressure exerted by the drum 18. Whenever the vacuum pressure at the feed head 101 is interrupted, however, the leading card is withdrawn by the drum 18 and moved through the mouth between the end of the wall 34 and the periphery of the drum.

A suitable cam operated actuating mechanism for the levers 102 and 103 may be provided, and details of such a mechanism are fully described in the copending application Ser. No. 645,639, now Patent No. 2,969,979. In the mechanism described in the copending application, a clutch is interposed in the drive for the cam in the actuating mechanism. This clutch is solenoid controlled, and successive pulsing of that solenoid causes the transfer mechanism to change in like succession from one operating mode to the other. Alternately, the levers may be under the control of a solenoid such as the solenoid 114. Energizing of the solenoid 114 causes the stack head 100 to be moved into its operative position and the feed head 101 to be moved to its standby position. Alternately, when the solenoid is de-energized, the stack head moves to its standby position and the feed head moves to its operative position.

When the transfer mechanism is actuated to its feeding mode of operation, the feed head 101 is moved forward into its operative position and the stack head 100 is retracted to its standby position. Alternately, when the transfer mechanism of the card holder is actuated to its stacking mode to strip cards from the periphery of the drum 18, the actuating mechanism moves the stack head 100 forward to fill the mouth between the end of the wall 34 and the periphery of the drum 18 and, at the same time, moves the feed head 101 back to a standby position.

When the feed head 101 is in its operative position, a suitable solenoid actuated valve 115 (FIGURE 1) in the vacuum line extending to the feed head can be operated to control the vacuum pressure at the face of the feed head. This, in turn, controls the transfer of cards from the card holder to the periphery of the drum 18. That is, whenever the valve 115 is energized, it closes and cuts off the vacuum pressure at the face of the feed head 101. As long as this vacuum pressure is interrupted, the cards 10 in the stack 12 are withdrawn by the drum 18 in a one-by-one sequence through the mouth formed between the end of the wall 35 and the periphery of the drum.

A lifter member 116 is mounted on a suitable stationary bracket, and this member is positioned adjacent the periphery of the drum 18 close to the leading wall 35 of the card holder 12. The member 116 has edges in the form of fingers which extend into the peripheral slots on the drum 18, and the member has a bulged central portion. The member 116 is so positioned that cards arrested by the stack head 100 when the solenoid 114 is energized have their trailing edges protruding over it. These trailing edges are, therefore, moved outwardly by the lifter member from the periphery of the drum 18. This allows the next succeeding card to move between the trailing edge of the preceding card and the lifter member 116 so as to strip the preceding card from the drum and deposit it in the card holder 12 with progressive movements of this next succeeding card along the lifter member. The actual configuration and construction of lifter members similar to the member 116 are described in detail in the copending application Ser. No. 645,639, now Patent No. 2,969,979.

Returning now to FIGURE 1, the card holder 13 associated with the drum 20 may have a similar control mechanism associated with it. This latter transfer mechanism may include, for example, a stack head 117 and a feed head 119 which are controlled in the described manner by a solenoid 121. This control mechanism may also include a solenoid actuated valve 123 for controlling the vacuum pressure at the feed head 119.

It will be noted in FIGURE 1 that a second card holder 150 is positioned on the common supporting surface with its mouth adjacent the drum 18. The card holder 150 is placed substantially diametrically opposite to the card holder 12 and may be constructed in a similar manner. The card holder 150 includes a control mechanism which, in turn, includes a pivotable feed head 152 and a pivotable stack head 154, the feed head being positioned adjacent the leading wall of the card holder and the stack head being positioned adjacent the trailing wall in the manner similar to the mechanism shown in FIGURE 2. The control mechanism associated with the card holder 150 is controlled by a solenoid 156. The vacuum pressure at the feed head 152 is controlled by a solenoid actuated valve 158.

A pair of guide members 160 and 162 are positioned between the drums 16 and 18 above the common center line of these drums. The guide members 160 and 162 are constructed and positioned in a manner similar to that described in copending application Ser. No. 614,686, filed October 8, 1956, for Jerome B. Wiener et al. A transfer member 164 is associated with the guide members 160 and 162. This transfer member is a pneumatic type and directs a stream of air tangentially of the periphery of the drum 18 and adjacent the mouth of the guideway formed by the guide members 160 and 162. Air pressure is supplied to the pneumatic transfer member 164 through a conduit 166, and a solenoid actuated valve 168 is positioned in the conduit.

The constructional details of the transfer member 164 may be similar to the assembly described in copending application Ser. No. 562,154, filed January 30, 1956 to Stuart L. Peck et al., and which will be described in conjunction with FIGURES 4 and 5. Moreover, the member 164 may have a configuration such as is shown in FIGURE 3 of the copending application Ser. No. 614,686 referred to above. The elements 160, 162, 164, 166 and 168 constitute a gate transfer mechanism for transferring cards from the periphery of the drum 18 onto the periphery of the drum 16, the drum 16 rotating, like the drum 18, in a counter-clockwise direction. The constructional details of this transfer mechanism are illustrated with greater particularity in FIGURE 6.

As shown in FIGURE 6, the gate transfer mechanism includes the pair of spaced, arcuate, parallel guide rails or members 160 and 162. The guide rail 160 will be designated as the outer rail and the guide rail 162 will be designated as the inner rail. These rails are disposed in essentially tangential relation to the drums 16 and 18 and are provided with a generally arcuate configuration, as best seen in FIGURE 6. The inner rail 162 extends between the two drums 16 and 18 and has its ends disposed adjacent the respective peripheral surfaces of the drums. The end of the inner rail 162 adjacent the drum 16 is spaced from the periphery of the drum a distance sufficient to allow a card to be circulated by the drum past the inner rail. The outer rail 160 is somewhat longer than the inner rail so that its ends project beyond the ends of the inner rail. The end of the outer rail adjacent the drum 18 is also spaced a sufficient distance from the periphery of that drum to enable a card to be freely transported by the drum past that rail. Likewise, the ends of the rails 160 and 162 adjacent the periphery of the drum 16 are spaced a sufficient distance from that periphery to enable cards to be freely transported by the drum 16 past those rails.

The transfer member 164 is disposed between the inner rail 162 and the periphery of the drum 18. This member is positioned in generally tangential relationship with the periphery of the drum 18, but it is spaced from the periphery a distance sufficient to allow the cards on the drum 18 to be circulated between the transfer member and the drum. As illustrated in FIGURE 6, the member 164 may have a shape corresponding substantially to a teardrop in a horizontal plane, and it is symmetrical about its central axis. This central axis, as previously noted, is essentially tangential to the periphery of the drum 18. This transfer member, of course, need not necessarily be pneumatic. It may, for example, be a pivotable mechanical type of mechanism.

The transfer member 164 is so positioned that air, or other fluid under pressure, may pass through its mouth portion along the peripheral surface of the drum 18 between the drum and the end of the inner guide rail 162. A passageway extends through the lifter which communicates with the feed line 166 (FIGURE 1). The other end of the feed line, as noted above, is adapted to receive air under pressure from any suitable air source, and the valve 168 is disposed in the line to control the flow of air through that line. This valve may be actuated by apparatus which includes a solenoid winding. A suitable control source may be provided for controlling the times that the solenoid valve 168 becomes energized. The valve 168 is opened whenever the solenoid winding is energized. When the solenoid valve is energized, air under pressure passes to the transfer member 164. This air flows through the lifter and emerges as streams of air under pressure. These streams of air have a relatively high velocity and impinge on the periphery of the drum 18 with relatively high force. This impingement of the streams is in a tangential direction between the inner rail 162 and the periphery of the drum 18, as noted above. The air streams in effect exert a force between the periphery of the drum 18 and the leading edge of the particular card 10 which they contact so as to shear the card from the drum. The air streams lift the leading edge of the particular card 10 from the periphery of the drum 18 in opposition to the retaining vacuum pressure exerted on the card through the peripheral channel of the drum.

After being lifted from the periphery of the drum, the leading edge of the card 10 becomes disposed between the inner rail 162 and the outer rail 160. Subsequent rotation of the drum 18 forces the card along the path between the guide rails 160 and 162. The length of each of the guide rails 160 and 162 in the illustrated embodiment is made shorter than that of the card so that the leading end of the card emerges from between the guide rails and comes under the influence of the drum 16. The drum 16 then draws the card out from between the guide rails and causes it to be transported on its peripheral surface.

Therefore, as long as the solenoid valve 168 is not energized, the cards are circulated on the drum 18 past the guide rails 160 and 162 and past the lifter 164 to the card holder 150. However, whenever the solenoid valve 168 is actuated to produce the streams of air from the mouth of the lifter 164, the next card to approach the mechanism is transferred to the peripheral surface of the drum 16.

A similar gate transfer mechanism is provided at the other side of the center line between the drums 16 and 18. This latter mechanism serves to return the card from the drum 16 to the drum 18. The latter gate transfer mechanism includes an outer guide rail 170 and an inner guide rail 172. A transfer member 174 controls the transfer of cards from the periphery of the drum 16 to the gate transfer mechanism, and a solenoid valve 176 in the feed line 178 extending to the member 174 controls the air pressure. The constructional details of this latter gate transfer mechanism may be the same as those described above in conjunction with the previous gate transfer mechanism.

A transducer means 180 is mounted on the common supporting surface to be adjacent the periphery of the drum 16 and in operating relationship with that drum. This transducer means is displaced, for example, about 45° from the entrance to the guide rails 170 and 172. A similar transducer means 181 is mounted on the common supporting surface adjacent the drum 18. This latter transducer is positioned between the card holder 12 and the gate transfer mechanism 160, 162 and 164.

The transducer means may be of the electro-magnetic type, and it may have any desired configuration. This transducer means serves to process the cards transported past it by the drum 16. The transducer means may read pertinent information recorded on such cards, or alternately it may be used to record other data on the cards. Suitable operating and control equipment for use in conjunction with the transducer means 180 is well known and need not be described here.

In the portion of the apparatus of FIGURE 1 thus far described, a stack of cards 10 that are to be processed may be positioned in the card holder 12. The solenoid 114 is then de-energized so that the transfer mechanism associated with the card holder 12 may be conditioned so that the stack head 100 is moved to its standby position and the feed head 101 is moved to its operative position. This conditions the card holder 12 as a feeding station. Simultaneously, the solenoid 156 associated with the transfer mechanism of the card holder 150 may be energized so that the feed head 152 is withdrawn to its standby position, and the stack head 154 is moved forward to its operative position. This conditions the card holder 150 as a stacking station. As noted above, full details of such a control of the control mechanism associated with the card holders 12 and 150 are described in the copending application Ser. No. 645,639, now Patent No. 2,969,979.

With the control mechanisms respectively associated with the card holders 12 and 150 conditioned to their positions described above, the card holder 12 commences to feed its cards in a one-by-one sequence to the periphery of the drum 18. These cards are carried in sequence by the drum 18 past the transducer means 181.

The transducer means 181 reads pertinent data on the successive cards as they leave the card holder 12. This transducer means is connected to an appropriate control system, one embodiment of which will be described in conjunction with FIGURE 1a and includes, for example, a compare network so that certain cards may produce a control effect. This system is controllable so that any desired card can be selected from the stack in the holder 12 for processing by the transducer 180. The cards from the card holder 12 are transported by the drum 18 past the transducer means 181 to the card holder 150 which is conditioned as a stacking station as noted above. These cards are successively stacked in the card holder 150 in the described manner. When a selected card in the card holder 12 is reached, the transducer means 181 causes the control system to produce a control signal which actuates the solenoid valve 168. This solenoid valve is actuated at the proper time so that the resulting air streams from the transfer member 164 cause the selected card to be transferred through the guide rails 160 and 162 to the peripheral surface of the drum 16. This card is then transported by the drum 16 past the transducer means 180 where it is processed in the manner described. The solenoid valve 176 is then actuated at the proper time by the control system to cause the lifter 174 to emit streams of air thereby causing the selected card to be fed into the guideway between the guide rails 170 and 172. The selected card, therefore, after processing by the transducer means 180 is returned to the drum 18 to and by it to the stacking station of the card holder 150.

As soon as the control system associated with the transducer means 181 produces a control effect in response to the selected card, the solenoid valve 115 in the feed line to the feed head 101 is operated so that the feed head exerts a vacuum pressure which prevents any further cards from being fed to the periphery of the drum 18 from the card holder 12. This control by the feed head 101 continues until the selected card is processed by the ransducer means 180 and fed to the stacking station card holder 150. Then, the vacuum pressure is released and further cards are successively fed from the card holder 12 to the periphery of the drum 18 until the next selected card is detected by the transducer means 181. Then the cycle is repeated.

Therefore, cards are continually fed from the card holder 12 to the drum 18, and such cards are transported by the drum to the card holder 150. Whenever a selected card whose data is to be processed is reached, the transfer of cards from the card holder 12 to the drum 18 is arrested until the selected card is transferred to the drum 16, processed by the transducer means 180, and returned to the drum 18 to be deposited in the output stack 150. Then the transfer of cards from the card holder 12 is re-initiated and continues until the next selected card is reached. This process continues until all the cards from the stack 12 have been fed to the drum 18 and have been deposited in the card holder 150. At such time, the solenoids 115 and 156 are actuated in the manner to be described in conjunction with FIGURE 1a. This actuation of the solenoids 115 and 156 causes the stack head 100 to be moved to its operative position and the feed head 101 to be moved to its standby position; and it also causes the feed head 152 to be moved to its operative position, and the stack head 154 to be moved back to its standby position. The card holder 12 is now conditioned as a stacking station, and the card holder 150 is conditioned as a feeding station. The cards in the card holder 150 are now successively fed to the drum 18 to be returned by the drum to the card holder 12. Upon the return of all the cards to the card holder 12, the process stops. The cards are now back in the card holder 12, and they are ready for the next cycle of operations in which the same or different cards may be automatically selected for processing by the transducer means 180.

Similar equipment may be provided for operation with the vacuum pressure transporting drum 20. This drum, like the drums 16 and 18, is also rotatable in a counter-clockwise direction, and it may have the same structural details as those described previously in conjunction with FIGURE 3.

Details of the card holder 13 and its associated transfer mechanism have been previously described. A transducer means 182 is positioned on the common supporting surface, and this transducer is located between the mouth of the card holder 13 and the entrance of a gate transfer mechanism which includes a pair of guide rails 184 and 186 and which may be similar in its construction to the gate transfer mechanism described above. A transfer member 188 is associated with the guide rails 184 and 186, and air pressure to the member 188 is controlled by a solenoid valve 190 in its feed line.

The transducer means 182, like the transducer means 181, is connected to a control system which causes the data on a selected card to produce a control effect which actuates the solenoid valve 190. This enables the selected card to be transferred to the periphery of the drum 16 by the gate transfer mechanism, in the described manner, for processing by the transducer means 180.

A further card holder 192 is positioned on the common supporting surface with its mouth adjacent the drum 20. The card holder 192 may be substantially diametrically opposite to the card holder 13. The card holder 192 has a stack head 194 mounted adjacent its trailing edge, and it has a feed head 196 mounted adjacent its leading edge. These elements may be similar in their construction to those described above in conjunction with the card holders 12, 13 and 150. The vacuum pressure to the feed head 196 is controlled by a solenoid valve 198 positioned in the feed line to this head. The operating positions of the stack head 194 and feed head 196 are controlled by a solenoid 200.

For the initial operating condition of the components associated with the drum 20, the solenoid 121 is de-energized so that the card holder 13 functions as a feeding station, and the solenoid 200 is energized so that the card holder 192 functions as a stacking station. For this condition, the feed head 119 is moved to its operative position and the stack head 117 is withdrawn to its standby position. Also, the feed head 196 is withdrawn to its standby position and the stack head 194 is moved forward to its operative position. Then, and in the manner described in conjunction with the drum 18, cards are fed from the card holder 13 to the periphery of the drum 20 and are carried by that drum to the card holder 192. Selected cards cause the transducing means 182 to produce a control effect which, in turn, causes such cards to be transferred through the guide rails 184 and 186 to the periphery of the drum 16 for processing by the transducer means 180.

The selected cards are subsequently returned to the periphery of the drum 20 through a gate transfer mechanism including a pair of guide rails 202 and 204. This latter gate transfer mechanism is positioned between the drums 16 and 20 on the side of the center line between these drums opposite the gate transfer mechanisms 184, 186 and 188. A transfer member 206 controls the transfer of cards from the periphery of the drum 16 to the guideway between the rails 202 and 204, and air pressure to the member 206 is controlled by a solenoid 208 in its feed line.

After the last card leaves the card holder 13, the solenoids 200 and 121 are actuated to reverse the condition of the control mechanisms associated with the card holders 13 and 192. The card holder 192 now becomes a feeding station and the card holder 13 becomes a stacking station. Cards are then successively fed from the card holder 192 to the periphery of the drum 20 to be transported back to the card holder 13. The arrangement is such that, while the card holder 12 is feeding cards to the drum 18 and while selected cards are being transferred from the drum 18 to the drum 16 for processing, the cards previously processed in the card holder 13 are in the process of being returned from the card holder 192 to the card holder 13. These returned cards are transported solely by the drum 20 and do not interfere in any way with the selected cards from the drum 18 which are transported by the drum 16. Then, at the conclusion of the transfer of cards from the card holder 12 to the card holder 150 and while cards are being returned from the card holder 150 back to the card holder 12, cards from the card holder 13 are transported to the card holder 192 and selected cards are transported on the drum 16 for processing.

The drum 16, therefore, serves to transport cards from two or more separate systems to a common processing transducer means 180. The arrangement is such that the cards in the plurality of systems do not interfere with one another but time-share the drum 16 and the common processing equipment associated with that drum.

It is believed that a person skilled in the art will be able to see that a plurality of systems can be used. For example, an additional pair of drums may be coupled to the drum 16 at substantial right angles to the drums 18 and 20 in FIGURE 1 to increase the time-sharing capacities of the system.

A suitable control system for performing the operations described above is shown in FIGURE 1a. Although the system shown in FIGURE 1a is able to operate on the cards from only two input stacks, additional control circuitry may be provided to obtain the selection of different input stacks on a time-sharing basis.

The control system of FIGURE 1a includes a source of direct voltage 300 having a positive terminal, a negative terminal and a grounded common terminal. A starting switch 302 for the system has its armature connected to the positive terminal of the source 300. The fixed contact of the switch 302 is connected to a capacitor 304 which, in turn, is connected to the input terminal of a differentiator network 306. The differentiator may be constructed in a manner similar to that on pages 2–27 to 2–38 inclusive of "Principles of Radar," Second Edition, by the Massachusetts Institute of Technology. The output terminal of the differentiator 306 is connected to each of a series of "or" networks 308, 310, 312 and 314. The "or" networks may be similar to those described and shown on page 32 of "Arithmetic Operations in Digital Computers," by R. K. Richards (published by D. Van Nostrand Co. in 1955). These "or" networks, in general, are known to the electronic and computer art. An "or" network is usually made up of a series of interconneced diodes and is designed to pass to a common output terminal any one of a plurality of input signals that might be introduced to its input terminals.

The feed head 196 associated with the card holder 192, and the feed head 101 associated with the card holder 12, each has a pair of contacts which are short circuited in the manner described in the copending application Ser. No. 645,639 when the last card leaves the corresponding holder. The contacts associated with the feed head 119 are indicated as 316 in FIGURE 1a, and the contacts associated with the feed head 196 are indicated as 318. These contacts are connected in series between the positive terminal of the source of direct voltage 300 and a capacitor 320. The capacitor 320 is connected to the input terminal of a differentiator 322, and the output terminal of the differentiator is connected to input terminals of the "or" networks 308, 310, 312 and 314.

Likewise, the feed head 152 has a pair of contacts 324 associated with it, and these contacts are closed when the card holder 150 is empty. In like manner, the feed head 119 has a pair of contacts 326, and these latter contacts are closed when the card holder 13 is empty.

The contacts 324 and 326 are connected in series between a capacitor 328 and the positive terminal of the source 300. The capacitor 328 is connected to a differentiator 330, and this differentiator is connected to input terminals of the "or" networks 308, 310, 312 and 314.

The output terminal of the "or" network 308 is connected to a triode 332. The cathode of the triode is grounded, and a resistor 334 connects the control grid of the triode to the negative terminal of the source 300. The anode of the triode is connected to one terminal of the energizing winding for the solenoid 114 which controls the transfer mechanism of the card holder 12. A resistor 336 is connected between the other terminal of the solenoid winding and the positive terminal of the source 300.

The "or" network 310 is connected to the control grid of a triode 338, this control grid being connected to one terminal of a resistor 340 and the other terminal of the resistor 340 being connected to the negative terminal of the source 300. The cathode of the triode 338 is grounded, and its anode is connected to one terminal of the energizing winding of the solenoid 156 which controls the transfer mechanism of the card holder 150. A resistor 342 is connected between the other terminal of the solenoid energizing winding and the positive terminal of the source 300.

The "or" network 312 is connected to the control grid of a triode 344. A resistor 346 is connected between this control grid and the negative terminal of the source 300, and the cathode of the triode is grounded. The anode of the triode 344 is connected to the energizing winding of the solenoid 121 which controls the transfer mechanism of the card holder 13. The other terminal of the solenoid energizing winding is connected to a resistor 348, which in turn is connected to the positive terminal of the source 300.

The "or" network 314 is connected to the control network of a triode 350. This control grid is connected to one side of a resistor 352. The other side of the resistor 352 is connected to the negative terminal of the source 300. The cathode of the triode 350 is grounded, and its anode is connected to one side of the energizing winding of the solenoid 200 which controls the transfer mechanism of the card holder 192. The other side of the winding 200 is connected to a resistor 354 which is connected to the positive terminal of the source of direct voltage 300.

The transducing means 181 may actually comprise a series of individual transducer heads indicated as 181a, 181b, 181c and 181d in FIGURE 1a. The heads 181a, 181b and 181c each scan a different horizontal row of magnetic areas of information on the cards, and there will be as many of these heads as there are rows of such information.

As described previously, the data on each of the cards 10 is recorded in the form of a plurality of areas of magnetic material of one polarity or the other. One polarity represents the "0" or "false" condition, and the other polarity represents the "1" or "true" condition. The rows of magnetic information on each card are arranged so that they define successive columns extending across the card, each such column corresponding to a position of the card. Each such position is represented by a clock indication "1" in the lowest row of the card, and these indications are read by the transducer head 181d.

The transducer heads 181a, 181b and 181c are respectively connected to the left input terminals of a plurality of flip-flops 356, 358 and 360. These flip-flops, are well known to the electronic art. A flip-flop is a bi-stable trigger circuit constructed in a manner similar to that described on pages 164 to 166, inclusive, of volume 19, entitled "Wave Forms," of the Radiation Laboratories Series published in 1949 by the Massachusetts Institute of Technology. The flip-flop is provided with two input terminals designated for convenience as the "left" and "right" input terminals, and it also has two output terminals designated for convenience as the "left" and "right" output terminals. A negative pulse introduced to the left input terminal triggers the flip-flop to its "true" state and produces a relatively high voltage at its left output terminal and a relatively low voltage at its right output terminal. Conversely, a negative pulse applied to its right input terminal triggers the flip-flop to its "false" state to produce a relatively high voltage at its right output terminal and a relatively low voltage at its left output terminal.

The transducer heads 181a, 181b and 181c are also respectively connected to a series of inverter networks 362, 364 and 366. These inverter networks function to invert the phase or polarity of the pulse applied to their input terminals, and may be simple single stage amplifiers. The output terminals of the inverters 362, 364 and 366 are connected to the right input terminals of respective ones of the flip-flops 356, 358 and 360.

The left and right output terminals of the flip-flops 356 are connected respectively to a pair of "and" networks 368 and 370. The left and right output terminals of the flip-flops 358 are respectively connected to a pair of "and" networks 372 and 374. The left and right output terminals of the flip-flops 360 are respectively connected to a pair of "and" networks 376 and 378.

The "and" network is also well known to the computer art, and it also is composed of a plurality of interconnected diodes. These diodes are connected to pass a signal to the common output terminal of the "and" network only when appropriate input signals are simultaneously introduced to all its input terminals. The "and" networks included in the inventive embodiments disclosed and claimed in this application may also be constructed in a manner similar to that described and shown on page 32 of "Arithmetic Operations in Digital Computers," by R. K. Richards.

The transducer head 181d is connected to the left input terminal of a flip-flop 380, and this transducer head is also connected to the input terminal of a delay line 382. Suitable amplifiers are usually interposed between the transducer heads 181a, 181b, 181c and 181d and their associated equipment.

The output terminal of the delay line 382 is connected to the right input terminal of the flip-flop 380. The delay of the delay line 382 is selected to be less than the interval between successive clock pulses from the transducer head 181d. Therefore, such pulses from the transducer head 181d trigger the flip-flop 380 to its "true" state, and the flip-flop is returned to its "false" state in the interval between such pulses.

The left output terminal of the flip-flop 380 is connected to the input terminal of a binary counter 384. The binary counter 384 comprises a series of flip-flops connected together in known manner and which assume operational states depending upon the number of pulses applied to the binary counter during any particular operating cycle. The left and right output terminals of all the flip-flops making up the binary counter are connected over individual leads, represented by a common cable connection 386, to a selector network 390. The selector network 390 is in turn connected to a compare network 388. The arrangement of the units 384, 388 and 390 is similar to that described in copending application Ser. No. 566,404, filed February 20, 1956, for Jerome B. Wiener. The selector network comprises a series of switches which cause the compare network 388 to translate a pulse only when the flip-flops in the binary counter 384 assume operational states corresponding to a selected number of pulses introduced to the binary counter by the flip-flop 380.

The output terminal of the compare network 388 is connected to the input terminal of each of the "and" networks 368, 370, 372, 374, 376 and 378.

The output terminal of the "and" network 368 is connected to the left input terminal of a flip-flop 390, and the output terminal of the "and" network 370 is connected to the right input terminal of that flip-flop. The output terminals of the "and" networks 372 and 374 are connected respectively to the left and right input terminals of a flip-flop 392. The "and" network 376 is connected to the left input terminal of a flip-flop 394, and the "and" network 378 is connected to the right input terminal of that flip-flop.

The left and right output terminals of the flip-flops 390, 392 and 394 are each connected to a comparator network 396. The comparator network is shown in block form for purposes of simplicity. Actually, this network is formed from a plurality of "and" and "or" networks inter-related in a logical pattern. The comparator may be constructed and operated in a manner similar to that disclosed and shown in FIG. 9 of commonly assigned copending application, Serial No. 540,826, filed October 19, 1955.

A selector 398 has a series of output terminals connected to the comparator network 396. This selector may be a usual patch board unit, or other switching device capable of providing signal indications corresponding to a particular binary number established in the instrument. The selector may be manually operated, or it may be operated automatically by an appropriate register. The selector 398 controls the comparator 396 in known manner, so that the comparator produces a pulse on its output lead 400 only when the flip-flops 390, 392 and 394 assume an operational pattern corresponding to the particular binary number set up by the selector 398.

The lead 400 is connected to an input terminal of an "and" network 402. The output terminal of the network 402 is connected to the left input terminal of a flip-flop 404 and to the input terminals of respective delay lines 406 and 408.

The right output terminal of the flip-flop 404 is connected to the control grid of a triode 410. This control grid is connected to a resistor 412 which, in turn, is connected to the negative terminal of the source 300. The cathode of the triode 410 is grounded, and the anode is connected to the energizing winding of the solenoid actuated valve 115 associated with the feed head 101 of the card holder 12. A resistor 414 is connected between this winding and the positive terminal of the source 300.

The output terminal of the delay line 406 is connected to the control grid of a triode 416. This control grid is connected to a resistor 418 whose other terminal is connected to the other terminal of the source 300. The cathode of the triode 416 is grounded, and its anode is connected to the energizing winding of the solenoid valve 168 associated with the gate transfer mechanism lifter 164. A resistor 420 connects the winding 168 to the positive terminal of the source 300.

The delay line 408 is connected to the control grid of a triode 422 and to the right input terminal of the flip-flop 404. The cathode of this triode is grounded, and the control grid is connected through a resistor 424 to the negative terminal of the source 300. The anode of the triode 422 is connected to the energizing winding of the solenoid valve 176 associated with the gate transfer lifter 174. The other terminal of this winding is connected to a resistor 426, and the resistor is connected to the positive terminal of the source 300.

The output lead 400 from the comparator 396 is also connected to an input terminal of an "and" network 428. A flip-flop 430 has its left output terminal connected to one terminal of the "and" network 402, and this flip-flop has its right output terminal connected to one terminal of the "and" network 428. The output terminal of the differentiator 322 is connected to the right input terminal of the flip-flop 430, and the output terminal of an "or" network 432 is connected to the left input terminal of this flip-flop. The output terminal of the differentiator 330 and the output terminal of the differentiator 306 are connected to corresponding input terminals of the "or" network 432.

The "and" network 428 is connected to the left input terminal of a flip-flop 434 and to the input terminals of a pair of delay lines 436 and 438.

The right output terminal of the flip-flop 434 is connected to the control grid of a triode 440, this control grid being connected to one terminal of a resistor 442. The other terminal of the resistor 442 is connected to the negative terminal of the source 300, and the cathode of the triode 440 is grounded. The anode of the triode 440 is connected to the energizing winding of the solenoid actuated valve 123 which controls the vacuum pressure to the feed head 119 of the card holder 13. This winding is connected by a resistor 444 to the positive terminal of the source 300.

The delay line 436 is connected to the control grid of a triode 446, and this control grid is connected to one terminal of a resistor 448 having its other terminal connected to the negative terminal of the source 300. The cathode of the triode 446 is grounded, and the anode is connected to the energizing winding of the solenoid valve 190 associated with the gate mechanism lifter 188. A resistor 450 is connected between the other terminal of the solenoid winding and the positive terminal of the source 300.

The output terminal of the delay line 438 is connected to the control grid of a triode 452 and to the right input terminal of the flip-flop 434. A resistor 454 is connected between the control grid of the triode 452 and the negative terminal of the source 300, and the cathode of this triode is grounded.

The anode of the triode 452 is connected to one terminal of the energizing winding of the solenoid valve 208 associated with the gate mechanism lifter 206. The other terminal of this winding is connected to a resistor 456 which, in turn, is connected to the positive terminal of the source 300.

The transducer means 182, like the transducer means 181, may comprise a plurality of individual transducer heads 182a, 182b, 182b and 182d. The heads 182a, 182b, and 182c scan successive rows of magnetic information on the cards 11 in like manner as the heads 181a, 181b and 181c scan the information on the cards 10. The head 182d scans clock indications recorded on the bottom row of each of the cards 11. The heads 182a, 182b and 182c are respectively connected to the heads 181a, 181b and 181c; and the head 182d is connected to the head 181d. Suitable amplifiers, not shown, may be interposed in the respective circuits from the heads 182a, 182b, 182c and 182d.

As mentioned briefly above, a stack of cards to be processed is placed in the card holder 12, and a second distinct stack of cards to be processed is placed in the card holder 13. This means that the contacts 316 associated with the feed head 101 of the card holder 12 are open, as are the contacts 326 associated with the feed head 119 of the card holder 13. However, the contacts 318 associated with the feed head 196 of the card holder 192 and the contacts 324 associated with the feed head 152 of the card holder 150 are adapted to be closed as soon as their associated feed heads are brought into their operating position because these two card holders are empty.

To initiate the operation of the system, the switch 302 is closed. This causes a charging current to flow into the capacitor 304 producing a resulting current pulse. This pulse is differentiated in the differentiator 306 so that its leading edge may be steepened. The differentiated pulse from the differentiator 306 is applied through the "or" networks 308, 310, 312 and 314 on the control grids of the triodes 332, 338, 334, and 350. The polarity of the differentiated pulse is such that its application to the triodes causes them momentarily to become conductive to cause a pulse of current to flow therough the energizing windings in their respective anode circuits.

The current pulse through the solenoid winding 114 causes, in the manner fully described in copending application Ser. No. 645,639, now Patent No. 2,969,979, the control mechanism associated with the card holder 12 to be actuated to its feeding operating condition. In this condition, the feed head 101 is in its operative position and the stack head 100 is withdrawn to its standby position. During this action, the solenoid valve 115 of FIGURE 1 is energized and closed. This cuts off the vacuum pressure at the feed head 101 and allows the cards to move out the card holder 12 in a one-by-one sequence.

At the same time, the pulse of current through the solenoid winding 156 causes the control mechanism of the card holder 150 to be conditioned to its stacking mode. In this mode, the stack head 154 is moved to its operative position, and the feed head 152 is withdrawn to its standby position.

In like manner, the current pulse through the solenoid winding 121 causes the stack head 117 associated with the card holder 13 to move to its operative position and the feed head 119 to be moved to its standby position. The control mechanism of the card holder 13 is, therefore, in a stacking condition.

Also, the current pulse through the energizing winding of the solenoid 200 causes the transfer mechanism of the card holder 192 to assume a feeding position. That is, the feed head 196 is moved forward into its operative position and the stack head 194 is moved back to a standby position. It might be pointed out that the control mechanism of the card holder 192 is ineffective in this position because of the lack of cards in the card holder. However, the switch 318 associated with the feed head 196 is closed because of htefact that the card holder 192 is empty.

The apparatus therefore, begins to operate in a cycle in which cards are continuously fed in sequence from the card holder 12 to the periphery of the drum 18, and in which such cards are transported by the drum past the transducing means 181. However, during this initial pass, the cards in the card holder 13 are retained in that holder because its transfer mechanism is in its stacking mode.

The cards from the card holder 12 move in succession past the individual transducer heads 181a, 181b, and 181c. Assuming that it is desired to select and process each of the cards 10 in the card holder 12 having a particular information recorded at a selected position on the cards, this position is set up by the adjustment of the selector network 390. For example, if the sixth position of each card is to be examined, the selector network is adjusted so that the compare network 388 passes a pulse from the binary counter 384 when the sixth pulse from the flip-flop 380 is supplied to the binary counter. It will be remembered that the flip-flop 380 is triggered back and forth by the head 181d as it scans the clock pulses on the lower row of each of the cards 10, and that the flip-flop 380 is so triggered once for each position of the card. Then, for the sixth position, the flip-flops in the binary counter 384 will assume an operational pattern which matches the setting of the selector network 390 so that the compare network 388 produces an output pulse.

Meanwhile, the transducer heads 181a, 181b, and 181c scan their corresponding rows for every position of the card 10 and they cause the flip-flops 356, 358, and 360 to assume respective operational states corresponding to the data at each such position. However, the "and" networks 368, 370, 372, 374, 376 and 378 are conditioned for translation by the compare network 398 only at the selected position of each card. Therefore, the flip-flops 390, 392 and 394 assume operational states corresponding to the information recorded at the selected position on each of the cards 10.

The information represented by the operational states of the flip-flops 390, 392 and 394 is fed to the comparator network 396. The selector 398 is controlled in the manner described so that a pulse is developed on the lead 400 only when the binary number fed to the comparator from the flip-flops 390, 392 and 394 corresponds to the number set up by the selector 398.

Therefore, only the cards which produce at their selected position a binary indication corresponding to a pre-set binary indication are able to produce a pulse on the output lead 400. So long as no output pulse is produced on the lead 400, the triodes 416 and 422 remain non-conductive, and the lifters 164 and 174 are ineffective. Therefore, the cards other than the desired cards pass under the transducer means 181 of FIGURE 1, and such cards are transported by the drum 18 to the card holder 150. Because the transfer mechanism of this latter card holder is conditioned in its stacking mode, these cards are deposited in the described manner in that card holder. When a desired card is reached which exhibits binary information matching the pre-set data at the selected position of the card, a pulse is produced on the output lead 400 as described above.

During the processing of cards from the card holder 12 to the card holder 150, the original pulse from the differentiator 306 causes the flip-flop 430 to be triggered to a true state. This is because that pulse is introduced to the left input terminal of the flip-flop 430 through the "or" network 432. This causes a relatively high voltage to be developed at the left output terminal of the flip-flop 430, and this voltage conditions the "and" network 402 for translation. Therefore the "and" network 402 translates the pulse on the output lead 400 to the left input terminal of the flip-flop 404 and to the delay lines 406 and 408. On the other hand, the "and" network 428 which is connected to the right output terminal of the flip-flop 430 is rendered non-conductive when the flip-flop is so triggered to a true state.

The flip-flop 404 is now triggered to a true state which renders the triode 410 non-conductive. This terminates a current flow through the solenoid valve 115 to open the valve and establish a vacuum pressure at the feed head 101. This vacuum pressure prevents any further cards from being fed from the card holder 12 to the periphery of the drum 18. A short time after, as determined by the delay line 406, the triode 416 becomes conductive to energize the solenoid valve 168. This causes the transfer member 164 to emit streams of air at the exact time the selected card reaches the entrance to the guideway defined by the guide rails 160 and 162. This card is lifted, therefore, in the manner described above, and it is moved through the guideway to the drum 16. The selected card is then transported by the drum 16 past the transducer means 180 so that its information may be read or more information may be added, as also described above.

At the precise time the selected card, after it has been processed by the head 180, reaches the entrance to the guide rails 170 and 172, or at any time up to that time, the delay line 408 causes the solenoid valve 176 associated with the transfer member 174 to be energized. This causes the card to be transferred to the guide rails and through them back to the drum 18. The card is then transported by the drum 18 to the card holder 150. At the same time, the pulse from the delay line 408 is introduced to the right input terminal of the flip-flop 404 to return that flip-flop to a false state. The triode 410, therefore, again becomes conductive, so that the vacuum pressure at the feed head 101 may be interrupted to allow the feed of the cards 10 from the card holder 12 to the periphery of the drum 18 to be resumed.

The above operations continue, with selected cards being moved to the drum 16 for processing by the transducer means 180 and the others being transported directly to the card holder 150 by the drum 18, until all the cards have been moved from the card holder 12 to the card holder 150. When the last card leaves the card holder 12, the switch contacts 316 associated with the feed head 101 are closed. Because the switch contacts 318 associated with the feed head 196 of the empty card holder 192 were previously closed, the closure of the switch contacts 316 completes a connection from the capacitor 320 to the source of direct voltage 300. This causes a pulse of current to flow into the capacitor 320 and this pulse is sharpened by the differentiator 322. The output pulse from the differentiator 322 produces a second current pulse through the solenoids 114, 156, 121 and 200. This causes the control mechanisms at each of the card holders to move from their present operating mode to their other operating mode. The card holder 12 therefore becomes a stacking station, and the card holder 150 becomes a feeding station. Also, the card holder 13 becomes a feeding station and the card holder 192 becomes a stacking station.

Therefore, the cards in the card holder 150 are fed in succession back to the card holder 12. As the last card leaves the card holder 150, the switch contacts 324 associated with its feed head 152 close. However, these have no immediate effect, because the switch contacts 326 associated with the feed head 119 of the card holder 13 are presumably still open.

During the second operating cycle, the output pulse from the differentiator 322 triggers the flip-flop 430 to its false state. Therefore, the "and" network 428 is now conditioned for translation, and the "and" network 402 is rendered non-conductive. The output pulses from the comparator 396 which appear on the lead 400, therefore, now operate the solenoid valve 123 associated with the feed head 119, and these pulses also operate the solenoid valves 190 and 208 associated with the lifters 188 and 206.

The selector network 390 and the selector 398 may be adjusted so that a different position, and pre-set data corresponding to a different binary number or other data, may be selected for each of the cards 11 from the card holder 13. These latter cards are fed continuously and in succession past the transducer means 182, and as was the case of the cards 10 from the card holder 12, the unwanted cards 11 are transported directly by the drum 20 to the card holder 192. Each desired card 11, on the other hand, causes the transducer heads 182a, 182b, and 182c in the previously described manner to produce a signal in the comparator 396 such that an output pulse is developed on the lead 400. This output pulse is passed by the now conductive "and" network 428, and it triggers the flip-flop 434 to its false state. This renders the triode 440 non-conductive and terminates the feed of cards from the card holder 13. Also, and at the proper intervals, the triodes 446 and 452 are rendered conductive and the solenoid valves 190 and 208 are energized to transfer the selected cards to the drum 16 for processing by the transducer means 180.

Therefore, while the cards 10 are being returned by the drum 18 from the card holder 150 to the card holder 12, the cards 11 from the card holder 13 are being transported past the transducer heads 182a, 182b, 182c and 182d and selected ones of these latter cards are being transferred to the drum 16 for processing by the common transducer means 180.

As noted above, when the last card leaves the card holder 150, the switch contacts 324 associated with its feed head 152 close. Later, when the last card leaves the card holder 13, the switch contacts 326 associated with its feed head 119 close. This latter closure completes a connection from the positive terminal of the source 300 to the capacitor 328. In a manner similar to that described above, the differentiator 330 now generates a pulse which is introduced to the triodes 332, 338, 344, and 350 through the respective "or" networks 308, 310, 312 and 314; and which is also introduced through the "or" network 432 to the left input terminal of the flip-flop 430. Therefore, the system now begins a second complete cycle. The selectors 390 and 398 may be appropriately adjusted so that different information at different positions on the cards may be made available during this second cycle. The control of the selectors is preferably automatic so that a group of adjacent columns on each card can be selected with the processing continuing from pass to pass from the least significant digit in the group, for example, to the most significant digit.

Therefore, the system of FIGURE 1 operates so that selected cards from the drum 18 may be processed on the common drum 16 while other cards are being returned on the drum 20, and vice versa. The cards from two distinctly different groups therefore share the common transporting drum 16, and they also share the transducer means 180 and its associated apparatus. These two separate and distinct groups of cards also share the common electronic control system of FIGURE 1a.

In the sorting embodiment of the invention shown in FIGURE 7, a plurality of cards 510 are arranged in stacked relationship in a card holder 512. A second stack of cards 511 are disposed in a second card holder 513. Each of the cards 510 and 511 has information recorded on it similar to the recording on the cards 10 and 11 described previously.

A plurality of rotatable vacuum pressure transporting drums are mounted on a common surface, and these drums are disposed adjacent to one another and to the card holders 512 and 513. For purposes of illustration, a plurality of drums 516–524 are provided with a similar construction. The drum 516 constitutes the central drum; and the drums 517, 518, 519 and 520 extend on one side of the drum 516 in adjacent relationship, whereas the drums 521, 522, 523 and 524 extend on the other side of the drum 516 in adjacent relationship. The card holder 512 is mounted on one side of the center line of the drums with its mouth adjacent the drum 521 so that the cards 510 supported in that holder may be fed to the periphery of that drum. The card holder 513, on the other hand, is disposed adjacent the drum 517 on the other side of the center line so that its cards 511 may be fed to the periphery of that latter drum. The card holder 512 has a transfer mechanism associated with it which includes a stack head 601. This head may be similar to the head 100 of FIGURE 2, and it is controlled by a solenoid 615. The transfer mechanism also includes a lifter member 617 similar to the lifter member 116 of FIGURE 2. When the solenoid 615 is not energized, the stack head 601 moves to its operative position and the transfer mechanism is in its stacking mode. A similar transfer mechanism is associated with the card holder 513. This latter mechanism includes a stack head 600, an actuating solenoid 614 and a pawl 616.

In a manner to be described, the cards in the card holder 512 and in the card holder 513 are individually and independently sorted by the disclosed system. This sorting is in accordance with the binary bits represented at any selected position on the cards in the individual card holders. These binary bits will usually represent decimal equivalents ranging from 0 to 9. Of course, alphabetic or other coding may be used. To accomplish the complete sorting process, it is necessary to provide eleven drums on either side of the common drum 516. For purposes of clarity of description, however, only four such drums are shown on either side of the central common drum 516. These drums are capable of sorting the cards on the basis of decimal equivalents from, for example, 0–3. It will be appreciated and it will be more clearly understood as the description proceeds, that by mere duplication the sorting capabilities of the apparatus may be extended on a digital basis by providing additional drums on either side of the common drum 516.

It will be noted in FIGURE 7, and as mentioned above, the card holder 512 is positioned adjacent the rotatable drum 521 on one side of the common center line of the drums, and the card holder 513 is positioned adjacent the drum 517 on the other side of this common center line. In like manner, a card holder 630 is positioned adjacent the rotatable drum 518 on the same side of the center line as the card holder 512. The card holder 630 and its transfer mechanism may be similar in its construction to the card holders 512 and 513 and their respective control mechanisms. That is, the control mechanism of the card holder 630 includes a stack head 632 positioned adjacent its trailing wall, and the stack head is controlled by a solenoid 634. The control mechanism also includes a pawl 635. As in the latter instances, the solenoid 634 when it is energized retracts the stack head 632 so that the cards in the card holder 630 may be fed in succession into the periphery of the drum 518. On the other hand, when the solenoid 634 is not energized the stack head 632 is spring biased into a position to arrest cards on the periphery of the drum 518 and to cause such cards to be deposited in the card holder 630.

A card holder 636 is positioned adjacent the rotatable drum 519, and this latter card holder is disposed on the same side of the center line as the card holder 513. The card holder 636 has a control mechanism including a stack head 638, a lifter 639, and a control solenoid 640.

A card holder 642 is positioned adjacent the rotatable drum 520, and this latter card holder is disposed on the same side of the common center line as the card holder 512. A stack head 644 is included in the control mechanism associated with the card holder 642, and this stack head is controlled by a solenoid 646. The later control mechanism also includes a lifter 647.

As noted previously in the present description, the number of drums on each side of the center drum 516 corresponds to the number of digits that are to be processed in the sorting operation of each independent stack of cards. As described, each of the drums 518, 519 and 520 has a card holder associated with its peripheral surface, and these card holders are disposed on opposite sides of the common center line for successive ones of these drums.

In like manner, a card holder 650 is associated with the drum 522, and this card holder is disposed on the opposite side of the common center line to the card holder 512. A stack head 652 and a lifter 653 are included in the control mechanism associated with the card holder 650, and the stack head is controlled by a solenoid 654. As with the other control mechanisms, the present mechanism is conditioned to its feeding mode and its stacking mode in accordance with the controls provided over the energizing of the solenoid 654.

Similarly, a pair of card holders 656 and 658 are respectively associated with the drums 523 and 524. The card holder 656 is placed on the same side of the common center line as the card holder 512, whereas the card holder 658 is placed on the opposite side of the center line. A stack head 660 and a pawl 661 are included in the transfer mechanism associated with the card holder 656, and this stack head is controled by a solenoid 662. Likewise a stack head 664 and a pawl 665 are associated with the card holder 658, and the latter stack head is controlled by the solenoid 666.

As illustrated by the arrows in FIGURE 7, the drums 516, 517, 519, 521 and 523 are adapted to rotate in a clockwise direction, and the drums 518, 520, 522 and 524 are adapted to rotate in the opposite direction. A gate transfer mechanism indicated generally at 670 is used to transfer the cards from the drum 521 to the drum 516. The gate transfer mechanism 670 may be constructed in a manner similar to that described previously in conjunction with FIGURE 6. The mechanism includes a transfer member 672 which, in turn, is controlled by a solenoid actuated valve 674. Likewise, the lifter 672 may be similar to that to be described in the description of FIGURES 4 and 5. Whenever the solenoid valve 674 is energized, streams of air are controlled to issue from the member 672. The streams of air travel tangentially to the peripheral surface of the drum 521, and they serve to lift cards up from the drum 521 to a guide portion of the transfer mechanism. This causes such cards to be directed by the guide to the drum 516. In the absence of such streams of air, the cards on the drum 521 are carried by the drum past the gate transfer mechanism 670, and the transfer mechanism is not effective.

A similar gate transfer mechanism indicated generally at 676 is used to controllably return the cards from the drum 516 to the drum 521. This latter transfer mechanism has a transfer member 678 associated with it, and the air to the member 678 is controlled by a solenoid actuated valve 680. The constructional details of this latter gate transfer mechanism may be similar to those of the transfer mechanism 670.

A further gate transfer mechanism indicated generally at 682 is used to controllably transfer the cards from the drum 516 to the drum 517. The transfer mechanism 682 includes a transfer member 684, and the air pressure to the transfer member is, in turn, controlled by a solenoid actuated valve 686. Yet another gate transfer mechanism, similar to those described above, is indicated at 688. This latter transfer mechanism is used to return the cards from the drum 517 to the drum 516. The gate transfer mechanism 688 includes a transfer member 690 which is coupled to a suitable pressure pump through a solenoid actuated valve 692.

A transfer member 700, which may be similar in its construction to the transfer members used in conjunction with the gate transfer mechanisms 670, 676, 682 and 688, is disposed in tangential relation to the drum 517 contiguous the adjacent point of this drum with the drum 518. The member 700 is coupled through a solenoid actuated valve 702 to an appropriate pressure pump. Whenever the solenoid portion of the valve 702 is energized, the valve is opened so that a stream of air is emitted by the member 700. This air travels tangentially to the drum 517 and serves to lift the cards from the peripheral surface of that drum and cause such cards to be transferred to the drum 518. Full details of a gate transfer mechanism similar to the assembly 700 and 702 may be found in copending application Ser. No. 562,154, which was filed January 30, 1956, for Stuart L. Peck et al.

A similar transfer member 704 is mounted adjacent the member 700, the member 704 being directed tangentially of the drum 518. The member 704 is coupled through a solenoid actuated valve 706 to an appropriate pressure pump. Whenever the valve 706 is actuated, the member 704 emits streams of air along the peripheral surface of the drum 518. These streams of air serve to remove the cards from the drum 518 and cause such cards to be returned to the drum 517.

Similar transfer members 708 and 710 are mounted respectively adjacent the drum 518 and 519. A solenoid actuated valve 712 couples the member 708 to the pressure pump, and a solenoid valve 714 couples the member 710 to the pressure pump. The member 708 is controllable in the manner described to effect a transfer of cards from the drum 518 to the drum 519. Likewise, the transfer member 710 is controllable to effect the return of cards from the drum 519 to the drum 518.

A pair of transfer members 716 and 718, of similar construction to those described above, are mounted to be respectively adjacent the drums 519 and 520. Solenoid actuated valves 720 and 722 respectively couple the members 716 and 718 to the pressure pump. A similar transfer member 724 is mounted adjacent the drum 520 and between it and the next succeeding drum. The member 724 is coupled to the pressure pump through a solenoid actuated valve 726.

Similar transfer members 730 and 732 are mounted to be respectively adjacent the drums 522 and 521 near the contiguous point of these drums. A solenoid actuated valve 734 couples the member 730 to the pressure pump, and a solenoid valve 736 couples the member 732 to the pressure pump. In like manner, a pair of transfer members 738 and 740 are positioned to be respectively adjacent the drums 523 and 522. The transfer member 738 is coupled to the pressure pump through a solenoid actuated valve 742, and the member 740 is coupled to the pressure pump through a solenoid actuated valve 744. Similar transfer members 746 and 748 are mounted respectively adjacent the drums 524 and 523. Solenoid actuated valves 750 and 752 respectively couple these transfer members to the pressure pump. Finally, a transfer member 754 is mounted adjacent the periphery of the drum 524, and this latter member is coupled to the pressure pump through a solenoid actuated valve 756.

The transfer member 732 serves to control the transfer of cards from the drum 521 to the drum 522. The member 730 controls the return of cards from the drum 522 to the drum 521. The member 740 controls the transfer of cards from the drum 522 to the drum 523. The member 738 controls the return of cards from the drum 523 to the drum 522. The members 746 and 748 respectively control the transfer of cards from the drum 524 to the drum 523, and from the drum 523 to the drum 524. The member 754 controls the transfer of cards from the drum 524 to the next succeeding drum.

The constructional details of the transfer members 700 and 704 will now be described in the following description and with reference to FIGURES 4 and 5. As noted above, the other transfer members used in the various transfer mechanisms may have a similar construction and, for that reason, need not also be described.

With reference now to FIGURES 4 and 5, the transfer mechanism including the transfer members 700 and 704 is shown in these figures. The drums 517 and 518 are shown as disposed in contiguous relation to each other in a manner similar to that shown in FIGURE 7. The drum 517 is provided with peripheral slots 804 corresponding to the slots 42 and 44 in the drum 16 described in conjunction with FIGURE 3. The two members 700 and 704 are disposed to exert a substantially tangential force on the periphery of their respectively associated drums 517 and 518. The member 700, for example, includes a feed line 808 which extends through the solenoid valve 702 to the pressure pump. The member 700 also includes a housing generally indicated at 810 (FIGURE 5).

The housing 810 is provided with a teardrop configuration, symmetrical about a center line, as seen from the plan view of FIGURE 4. The housing is disposed so that its thin end is adjacent the peripheral surface of its corresponding drum 517. The housing 810 is disposed relative to its associated drum 517 so that the line of symmetry when extended is essentially tangential to that drum. The point of tangency of this line corresponds substantially to the position of contiguity between the drums 517 and 518. The housing 810 has a passageway 812 (FIGURE 5) in communication with the supply line 808, and it also has a mouth portion 814 in communication with the passage 812. Apertures 816 are provided in the housing 810 at vertical levels corresponding to the slots 804 in the drum 517 with which the lifter is associated.

Air under pressure passes through the feed line 808 and through the housing 810. The air flows through the passageway 812 and through the mouth portion 814 of the housing 810, and it emerges as streams of air from the apertures 816 at the thin end of the housing. The streams of air have a relatively high velocity because of the small diameter of the apertures 816. This causes the streams of air to impinge on the periphery of the associated drum with a relatively great force.

The streams of air emerging from the apertures 816 in effect exert a shearing force between the periphery of the drum 517 and the cards on the drum. This causes such cards to become removed from the drum. The cards so removed are attracted by the adjacent drum 518 and are effectively transferred from the drum 517 to the drum 518.

In this manner, and by the selective energizing of their associated solenoid actuated valves, cards may be transferred from one drum to another by the gate transfer mechanisms such as the one described above. Although the lifter mechanisms between the drums in each instance are shown as two distinct units it is clear that each pair could be included in a single housing. Also, if so desired, the rail type transfer mechanism, such as the transfer mechanisms 670, 676, 682, 688, may be used to effect card transfers between all the drums.

The circuit and control system shown in FIGURES 8a and 8b operates in accordance with the information recorded at the various positions on the various cards. This information may be in binary form in which an indication having first characteristics represents a binary value of "0," and in which an indication having second characteristics represents a binary value of "1." For example, when the information is in magnetic form, a magnetic bit of a selected polarity may represent an indication of "1," and a magnetic bit of the opposite polarity may represent an indication of "0." Indications of "1" and "0" are illustrated schematically on the fragment of one of the cards 510 or 511 shown in FIGURE 8a.

The bits of binary information on the card 510 or 511 shown in FIGURE 8a are arranged in a series of horizontal rows. One of the horizontal rows, such as the bottom row of the card, may have an indication of "1" for each position of the card. By providing an indication of "1" in each position of the card, a clock count, as in the previous embodiment, may be obtained as to the number of vertical columns of any card which have been read at any particular instant. In this way, a selected vertical column of each of the cards may be made available for processing in a manner to be described.

A transducing means 900 is shown in FIGURE 7 as associated with the drum 516, and this transducing means is disposed on the opposite side of the common center line to the card holder 512. The transducing means 900 may actually be constituted by a series of transducer heads 902, 904, 906, 908 which are illustrated in FIGURE 8a, which heads read successive rows of the data on the card. Each such row of data has a separate transducer head associated with it, and it is clear that (as before) the number of transducer heads is dictated by the number of rows of such data on the cards to be processed.

The transducer heads 902, 904, 906 and 908 may have any suitable and known construction for transforming variations in magnetic flux into corresponding control signals. Each of the transducer heads is provided, for example, with magnetic means such as a coil. The coil in each transducin head is so disposed as to be magnetically coupled to the cards 510 or 511 during movement of the cards on the drum 516 past the transducer heads. As will be described in detail subsequently, the transducer heads 902, 904, 906 and 908 are connected to "read" the magnetic indications in the different rows on the cards and to convert these magnetic indications into a corresponding pattern of electrical signals.

The output signals from the transducer heads 902, 904, 906 and 908 are introduced to amplifiers such as amplifiers 910, 912, 914 and 916, respectively. The output signals from the amplifiers 910, 912, 914 and 916 are introduced to corresponding left input terminals of flip-flops such as flip-flops 918, 920, 922 and 924.

The output signals from the amplifier 910 are also introduced through a delay line 926 to the right input terminal of the flip-flop 918. The delay line 926 is adapted to provide a delay equal to substantially one-half of the time required for adjacent transverse columns on the cards 510 or 511 to move past the heads such as the heads 902, 904, 906 and 908. The output signals from the amplifiers 912, 914 and 916 are also respectively introduced through inverters 928, 930 and 932 to the right input terminals of the flip-flops 920, 922 and 924.

The flip-flops such as the flip-flops 920, 922 and 924 also have two ouptut terminals designated as noted above as the left and right output terminals. The left and right output terminals of these flip-flops are shown as being connected to a translator indicated in block form as 934. The translator provides a decoding of binary numbers to corresponding decimal values. Such a translation may be obtained by a bi-quinary decoding network or other suitable decoding network or matrix system. Such networks are well known in the art. It should be appreciated, however, that any translator for decoding numbers of one matrix into numbers of another matrix, or for changing any information from one form to another may also be used.

The translator 934 may be constructed in a manner similar to that indicated in the lower left corner of FIG. 7 of Hartley Patent 2,444,042. As will be seen in FIG. 1 of the Hartley patent, the switches SA2 and SB2 are respectively controlled in accordance with the values of binary digits of first and second least digital significance. The switches SC2 and SC3 are controlled in accordance with the value of the binary digit of third least significance. The switches SD2, SD3, SD4, SD5 and SD6 in the Hartley patent are controlled in accordance with the value of the binary digit of fourth least digital significance.

The flip-flop 920 in FIG. 8a of applicant's drawings may control the operation of the switch SA2 in a manner similar to the control provided by the flip-flops 1250a, 1250b, 1250c and 1250d over the operation of the switch 1211 in FIG. 9 of applicant's drawings. In like manner the flip-flop 920 in FIG. 8a of applicant's drawings may control the operation of the switch SB2 in the Hartley patent in a manner similar to the control provided by the flip-flops 1050a, 1050b, 1050c and 1050d over the operation of the switch 1211 in FIG. 9 of applicant's drawings. Similarly the flip-flop 924 in FIG. 8a of applicant's drawings may control the operation of the switches SC2 and SC3 in FIG. 1 of the Hartley patent in a manner similar to the control provided by the flip-flops 1250a, 1250b, 1250c and 1250d over the operation of the switch 1211 in FIG. 9 of applicant's drawings.

It will be appreciated that the Hartley patent actually constitutes only one reference and that other references may also be used to indicate the construtcion of the translator 934 in FIG. 8a of applicant's drawings.

For example, suitable translators are shown and disclosed in Luhn Patent 2,364,540, and Bray Patent 2,576,099.

The translator 934 has a plurality of output terminals. For example, when a binary pattern of signal indications is translated into a decimal pattern, the translator will have ten output terminals each representing a different number from 0 to 9. In a practical embodiment of the invention, the cards 510 or 511 would have sufficient rows in addition to the bottom clock row, so that each column may represent decimal numbers of from 0 to 9, these rows being scanned by a corresponding plurality of transducing members such as the heads 904, 906 and 908. Then, the flip-flops 920, 922, and 924 would be extended in number to correspond to the number of such rows and to supply the necessary input signals to the translator 934 to permit the translator to provide a decoding sequence of from 0 to 9 for each column. However, and to simplify the description, only three rows of information and only three flip-flops 920, 922 and 924 are shown, and the translator 934 is illustrated as providing decimal equivalents of from 1 to 3.

The No. 1 output terminal of the translator 934 is connected to one of the input terminals of an "and" network 936. The No. 2 output terminal of the translator is connected to an input terminal of an "and" network 938, and the No. 3 output terminal of the translator is connected to an input terminal of an "and" network 940.

The left output terminal of the flip-flop 918 is connected to the input terminal of a binary counter 942. This binary counter may be similar to the binary counter 384 described in conjunction with FIGURE 1a. A selector network 944 is provided and is connected to receive signals from the counter 942 and to introduce signals to a compare network 948. The compare network 948, like the compare network 388 of the system of FIGURE 1a, provides an output pulse for a given number of input pulses to the binary counter 942 for any particular count as determined by the setting of the selector 944. The binary counter itself develops an output pulse on the lead 950 corresponding to the full count which, in turn, corresponds to the end of each card scanned by the transducer heads 902, 904, 906 and 908.

The output terminal of the compare network 948 is connected to respective input terminals of each of the "and" networks 936, 938 and 940. The "and" network 936 is connected to the left input terminal of a flip-flop 952. The lead 950 from the binary counter 942 is connected to an input terminal of an "and" network 954, and the left output terminal of the flip-flop 952 is also connected to an input terminal of this "and" network. The output terminal of the "and" network 954 is connected to the right input terminal of the flip-flop 952, and this output terminal is also connected to the left input terminal of a flip-flop 956.

The left output terminal of the flip-flop 956 is connected to an input terminal of an "and" network 958, and the lead 950 from the binary counter 942 is connected to a second input terminal of this "and" network. The output terminal of the "and" network 958 is connected to the right input terminal of the flip-flop 956 and to the left input terminal of a flip-flop 960. The left output terminal of the flip-flop 960 is connected to an input terminal of an "and" network 962, and the lead 950 from the binary counter 942 is connected to a second input terminal of this "and" network. The output terminal of the "and" network 962 is connected to the right input terminal of the flip-flop 960. The right output terminal of the flip-flop 960 is connected to one input terminal of an "and" network 964 (FIGURE 8b).

The output terminal of the "and" network 938 is connected to the left input terminal of a flip-flop 966. The left output terminal of the flip-flop 966 is connected to the input terminal of an "and" network 968. The lead 950 from the binary counter 942 is connected to a second input terminal of this "and" network 968, and the output terminal of the "and" network 968 is connected to the right input terminal of the flip-flop 966 and to the left input terminal of a flip-flop 970. The left output terminal of the flip-flop 970 is connected to an input terminal of an "and" network 972, and the lead 950 from the binary counter 942 is connected to a second input terminal of this "and" network.

The output terminal of the "and" network 972 is connected to the right input terminal of the flip-flop 970 and to the left input terminal of a flip-flop 974. The left output terminal of the flip-flop 974 is connected to one of the input terminals of an "and" network 976. The lead 950 from the binary counter 942 is connected to a second input terminal of this latter "and" network 976.

The output terminal of the "and" network 976 is connected to the right input terminal of the flip-flop 974 and to the left input terminal of a flip-flop 978. The left output terminal of the flip-flop 978 is connected to one of the input terminals of an "and" network 980. The lead 950 from the binary counter 942 is connected to a second input terminal of the "and" network 980, and the output terminal of this "and" network is connected to the right input terminal of the flip-flop 978. The right output terminal of the flip-flop 978 is connected to one of the input terminals of an "and" network 982 (FIGURE 8b).

The output terminal of the "and" network 940 is connected to the left input terminal of a flip-flop 984. The left output terminal of the flip-flop 984 is connected to an "and" network 986, and the lead 950 from the binary counter 942 is also connected to an input terminal of this "and" network. The output terminal of the "and" network 986 is connected to the right input terminal of the flip-flop 984 and to the left input terminal of a flip-flop 988. The left output terminal of the flip-flop 988 is connected to an input terminal of an "and" network 990, and the lead 950 from the binary counter 942 is also connected to an input terminal of this "and" network 990.

The output terminal of the "and" network 990 is connected to the left input terminal of a flip-flop 992 and to the right input terminal of the flip-flop 988. The left output terminal of the flip-flop 992 is connected to an input terminal of an "and" network 994, and the lead 950 from the binary counter 942 is connected to a second input terminal of this "and" network.

The output terminal of the "and" network 994 is connected to the right input terminal of the flip-flop 992 and to the left input terminal of a flip-flop 996. The left output terminal of the flip-flop 996 is connected to an input terminal of an "and" network 998, and the lead 950 is connected to a second input terminal of this "and" network.

The output terminal of the "and" network 998 is connected to the right input terminal of the flip-flop 996 and to the left input terminal of a flip-flop 1000. The left output terminal of the flip-flop 1000 is connected to an input terminal of an "and" network 1002, and the lead 950 is also connected to an input terminal of this "and" network. The output terminal of the "and" network 1002 is connected to the right input terminal of the flip-flop 1000. The right output terminal of the flip-flop 1000 is connected to an input terminal of an "and" network 1004 (FIGURE 8b).

The right output terminal of the flip-flop 960 is also connected to one of the input terminals of an "and" network 1006 in FIGURE 8b. The right output terminal of the flip-flop 978 is also connected to an input terminal of an "and" network 1008, and the right output terminal of the flip-flop 1000 is also connected to an input terminal of an "and" network 1010.

The control system of FIGURE 8a also includes a source of direct voltage 1012. This source has a positive terminal and a negative terminal and it also has a grounded common terminal.

The system includes a pair of double throw switches 1014 and 1016 (FIGURE 8a) which are mechanically intercoupled and which may be manually operated from their illustrated position to a second position to initiate the operation of the control system. The lower fixed contact of each of the switches 1014 and 1016 is connected to the positive terminal of the source 1012. A capacitor 1018 connects the armature of the switch 1014 to the input terminal of a differentiator 1020, and the upper fixed contact of the switch 1014 is connected to the input terminal of the differentiator by a discharge resistor 1022.

The output terminal of the differentiator 1020 is connected to one input terminal of an "or" network 1021. The output terminal of this "or" network 1021 is connected to the left input terminal of a flip-flop 1024. The left output terminal of the flip-flop 1024 is connected to the control grids of each of a series of triodes 1026, 1028, 1030 and 1032 (FIGURE 8b). The left output terminal of the flip-flop 1024 is also connected to a second input terminal of each of the "and" networks 964, 982 and 1004.

The output terminals of the "and" networks 964, 982 and 1004 are respectively connected to the control grids of a series of triodes 1034, 1036 and 1038. The cathodes of all of the triodes 1026, 1028, 1030, 1032, 1034, 1036 and 1038 are all grounded, and the control grids of these triodes are respectively connected to the negative terminal of the source 1012 through respective resistors 1040, 1042, 1044, 1046, 1048, 1050 and 1052.

One terminal of the energizing winding of the solenoid 615 which operates the stack head 601 of the card holder 512 is connected to the anode of the triode 1026. A resistor 1054 connects the other terminal of this winding to the positive terminal of the source 1012. The energizing winding of the solenoid valve 674 associated with the lifter 672 of the gate mechanism 670 is connected to the anode of the triode 1028. A resistor 1056 connects the other terminal of this winding to the positive terminal of the source 1012.

The energizing winding 680 of the solenoid valve associated with the lifter 678 of the gate mechanism 676 has one terminal connected to the anode of the triode 1030, the other terminal of this winding being connected to a resistor 1058, which resistor is connected to the positive terminal of the source 1012.

The energizing winding 736 of the solenoid valve associated with the lifter 732 is connected to the anode of the triode 1032. A resistor 1060 connects this winding to the positive terminal of the source of direct voltage 1012.

The energizing winding of the solenoid 744 associated with the lifter 740 is connected between the anode of the triode 1034 and a resistor 1062, the other side of this resistor being connected to the positive terminal of the source 1012.

The energizing winding 752 of the solenoid valve associated with the lifter 748 is connected to the anode of the triode 1036, and a resistor 1064 connects this winding to the positive terminal of the source 1012.

Finally, the energizing winding of the solenoid 756 associated with the lifter 754 is connected to the anode of the triode 1038. A resistor 1066 connects the other terminal of this winding to the positive terminal of the source 1012.

The right output terminal of the flip-flop 1024 is connected to the control grid of each of a series of triodes 1068, 1070, 1072 and 1074 (FIGURE 8b). The right output terminal of the flip-flop 1024 is also connected to the fixed contact of each of a pair of switches 1076 and 1078. These switches may be of the type presently marketed by the Minneapolis-Honeywell Company, of Minneapolis, Minnesota, and designated by them as a "Microswitch." The switch 1076 is positioned in the card holder 650 and is adapted to close whenever the last card leaves this card holder and to open whenever there is a card in the card holder. The switch 1078, on the other hand, is positioned at the mouth of the card holder 656. This latter switch closes when the last card leaves the card holder 656 and is opened whenever there is a card in this card holder. The armature of the switch 1076 is connected to the control grid of a triode 1080, and the armature of the switch 1078 is connected to the control grid of a triode 1082.

The cathodes of each of the triodes 1068, 1070, 1072, 1074, 1080 and 1082 are each grounded. A series of resistors 1084, 1086, 1088, 1090, 1092 and 1094 connect respective ones of the control grids of these triodes to the negative terminal of the source 1012.

The energizing winding of the solenoid 734 associated with the lifter 730 is connected to the anode of the triode 1068, and a resistor 1096 connects the other terminal of this winding to the positive terminal of the source 1012. The energizing winding of the solenoid valve 742 associated with the lifter 738 is connected between the anode of the triode 1070 and one side of a resistor 1098, the other side of this resistor being connected to the positive terminal of the source 1012. The energizing winding of the solenoid valve 750 associated with the lifter 746 is connected to the anode of the triode 1072 and the other terminal of this winding is connected to a resistor 1100. The resistor 1100 is connected to the positive terminal of the source 1012.

The energizing winding of the solenoid 654 which operates the stack head 652 of the card holder 650 has one terminal connected to the anode of the triode 1074. The other terminal of this winding is connected to a resistor 1102 which, in turn, is connected to the positive terminal of the source 1012. The energizing winding of the solenoid 662 which actuates the stack head 660 of the card holder 656 is connected to the anode of the triode 1080, and the energizing winding of the solenoid 666 which actuates the stack head 664 of the card holder 658 is connected to the anode of the triode 1082. A pair of resistors 1104 and 1106 respectively connect the windings of the solenoids 662 and 666 to this positive terminal of the source 1012.

The armature of the switch 1016 is connected to a capacitor 1108, which capacitor is connected to the input terminal of a differentiator 1110. The upper fixed contact of the switch 1016 is connected to one side of a discharge resistor 1112, and the other side of this resistor is connected to the input terminal of the differentiator 1110.

The output terminal of the differentiator 1110 is connected to an input terminal of an "or" network 1113. The output terminal of the "or" network 1113 is connected to the left input terminal of a flip-flop 1114. The left output terminal of the flip-flop 1114 is connected to the control grid of each of a series of triodes 1116, 1118, 1120 and 1122. The left output terminal of the flip-flop 1114 is also connected to the fixed contact of each of a pair of switches 1124 and 1126. These latter switches may be similar in their construction to switches 1076 and 1078. The switch 1124 is positioned in the mouth of the card holder 630, and it closes when the last card leaves this card holder. Moreover, the switch 1124 is open whenever there is a card in this card holder. The switch 1126 is positioned in the mouth of the card holder 636, and this latter switch closes when the last card leaves that card holder. The armatures of the switches 1124 and 1126 are connected respectively to the control grids of a triode 1128 and of a triode 1130.

The cathodes of the triodes 1116, 1118, 1120, 1122, 1128 and 1130 are all grounded. A series of resistors 1132, 1134, 1136, 1138, 1140 and 1142 connect the respective control grids of these triodes to the negative terminal of the source 1012.

The energizing winding of the solenoid valve 706 for the gate 704 is connected to the anode of the triode 1116. The energizing winding of the solenoid 714 associated with the gate 710 is connected to the anode of the triode 1118, and the energizing winding of the solenoid 722 associated with the lifter 718 is connected to the anode of the triode 1120. The winding of the solenoid 634 which actuates the stack head 632 of the card holder 630, and the winding of the solenoid 640 which actuates the stack head 638 of the card holder 636 are respectively connected to the anodes of the triodes 1122 and 1128. Finally, the energizing winding of the solenoid 646 which controls the stack head 644 associated with the card holder 642 is connected to the anode of the triode 1130. A series of resistors 1144, 1146, 1148, 1150, 1152 and 1154 respectively connect these windings to the positive terminal of the source 1012.

The right output terminal of the flip-flop 1114 is connected to the control grids of a series of triodes 1156, 1158, 1160, and 1162. The right output terminal of the flip-flop 1114 is also connected to a second input terminal of each of the "and" networks 1006, 1008 and 1010. The output terminal of the "and" network 1006 is connected to the control grid of a triode 1164, and the output terminals of the "and" networks 1008 and 1010 are respectively connected to the control grids of a pair of triodes 1166 and 1168. The cathodes of the triodes 1156, 1158, 1160, 1162, 1164, 1166 and 1168 are all grounded. A series of resistors 1170, 1172, 1174, 1176, 1178, 1180 and 1182 connect the control grids of the triodes 1156, 1158, 1160, 1162, 1164, 1166 and 1168 to the negative terminal of the source of direct voltage 1012.

The energizing winding of the solenoid 614 which controls the stack head 600 of the card holder 513 is connected to the anode of the triode 1156. The energizing winding of the solenoid valve 692 which controls the transfer member 690 of the gate 688 is connected to the anode of the triode 1158. The energizing winding of the solenoid valve 686 which controls the transfer member 684 to the gate 682 is connected to the anode of the triode 1160, and the energizing winding of the solenoid valve 702 which controls the transfer member 700 is connected to the anode of the triode 1162.

The energizing winding of the solenoid valve 712 which controls the transfer member 708 is connected to the anode of the triode 1164. The energizing winding of the solenoid valve 720 which controls the transfer member 716 is connected to the anode of the triode 1166, and the energizing winding of the solenoid 726 which controls the transfer member 724 is connected to the anode of the triode 1168. A series of resistors 1184, 1186, 1188, 1190, 1192, 1194 and 1196 respectively connect these windings to the positive terminal of the source 1012.

A switch 1198 (FIGURES 7 and 8a) which may be of the Microswitch type, like the switches described above, is included in the card holder 642, and this switch is opened whenever there is a card in this card holder. However, when the last card leaves the card holder 642 the switch 1198 closes. The armature of the switch 1198 is connected to the positive terminal of the source 1012, and the fixed contact of this switch is connected to the lower fixed contact of a double-throw switch 1200. The switch 1200 may also be of the Microswitch type, and this latter switch is included in the card holder 512. The armature of the switch 1200 closes on its lower contact when the last card leaves the card holder 512, and this armature closes on its upper fixed contact whenever there are cards in the card holder 512.

A resistor 1202 connects the upper fixed contact of the switch 1200 to the input terminal of a differentiator 1204, and a capacitor 1206 is connected between the input terminal of the differentiator and the armature of the switch 1200. The output terminal of the differentiator 1204 is connected to a delay line 1208 which, in turn, is connected to the right input terminals of the flip-flop 1024 and of the flip-flop 1114.

A switch 1210 is positioned in the card holder 658. This switch may be similar in its construction to the switch 1198, and the switch 1210 closes when the last card leaves the card holder 658. The armature of the switch 1210 is connected to the positive terminal of the source of direct voltage 1012, and the fixed contact of this switch is connected to a pair of normally closed contacts 1211 which are connected to the lower fixed contact of a double-throw switch 1212. The switch 1212 may be similar in its construction to the switch 1200, and the switch 1212 is positioned in the card holder 513. The armature of the switch 1212 is closed on the upper fixed contact of the switch when there are cards in the card holder 513, and the armature closes on the lower fixed contact when the last card leaves this card holder.

A discharge resistor 1214 connects the upper fixed contact of the switch 1212 to the input terminal of a differentiator 1216. A capacitor 1218 connects the armature of the input terminal of this differentiator. The output terminal of the differentiator 1216 is connected to a delay line 1220, and the output terminal of the delay line is connected to a second input terminal of each of the "or" networks 1021 and 1113.

The apparatus and system of FIGURES 7, 8a and 8b is capable of simultaneously sorting two separate stacks of cards in the card holder 512 and in the card holder 513. The apparatus of FIGURE 7 functions in a manner to be described, first to transport the cards 510 from the card holder 512 in succession on the periphery of the drum 521, and then to successively transfer the cards to the periphery of the drum 516 through the gate transfer mechanism 670. The cards 510 are carried in succession on the periphery of the drum 516 past the transducer means 900 to the gate transfer mechanism 676. These cards are then returned by the gate 676 to the periphery of the drum 521. The cards are then successively transferred from the drum 521 to the drum 522 by the lifter 732.

A selected position on each card 510 is set up by the selector 944 (FIGURE 8a) for sorting in the first pass; and the cards 510 are stacked in the holders 650, 656 and 658 depending upon the binary number represented in each card at that position. For example, all the cards 510 whose recorded information at the particular chosen position corresponds to the decimal equivalent "1" are deposited in the card holder 650. In like manner, all the cards 510 exhibiting binary data corresponding to the decimal equivalent "2" at the selected position are deposited in the card holder 656, and those exhibiting binary data corresponding to the decimal equivalent "3" are all deposited in the card holder 658.

Then, all the cards 510 are automatically returned to the card holder 512, with those in the card holder 650 being returned first, then those in the card holder 656 and finally those in the card holder 658.

It should again be repeated that the sorting in the illustrated embodiment is carried merely to the third decimal digit for purposes of simplicity of description. In a practical apparatus, of course, additional drums could be provided and the sorting would preferably be carried to the tenth decimal digit.

While the cards from the card holders 650, 656 and 658 are being returned to the card holder 512 after the initial sorting operation, the cards 511 from the card holder 513 are automatically fed to the periphery of the drum 517. These latter cards are transferred by the gate 688 to the drum 516 for processing by the transducer means 900, and these cards are then returned to the drum 517 by the gate 682. The cards 511 are then transferred by the member 700 to the drum 518 to be deposited in the card holders 630, 636 or 642. The cards 511 are deposited in these card holders, as in the previous instance, in accordance with the decimal equivalent represented at a selected position of each card.

When the above sorting operation is completed, the cards 511 from the card holder 630 are returned in sequence to the card holder 513, and then the cards 511 from the card holders 636 and then 642 are also sequentially returned.

While the cards 511 are being returned from the card holders 630, 636 and 642, the cards 510 from the card holder 512 are made to undergo a second pass so that a sorting operation can be made on these cards at a second selected position. In this manner, the two indepedent sorting operations are carried on essentially simultaneously, the cards 510 from the card holder 512 being sorted while the cards 511 from the card holder 513 are being returned, and vice versa. In each instance, use is made of a common drum 516, a common transducer means 900 and a common electronic control system for the sorting of these two independent stacks of cards. The sorting of each independent stack of cards from position to position in a sequence of passes is usually controlled automatically through a group of positions starting from a least significant digit in a block of data to the most significant digit. This permits the cards to be sorted with respect to the entire block of data represented by these positions on each card.

To initiate the control system of FIGURES 8a and 8b so as to start the operation of the apparatus of FIGURE 7, the start switches 1014 and 1016 are manually depressed. This causes each of the differentiators 1020 and 1110 to generate a pulse in the manner described in conjunction with the control system of FIGURE 1a. These pulses from the differentiators respectively cause the flip-flops 1024 and 1114 to be triggered to their true states.

When the flip-flop 1024 is triggered to its true state, the triodes 1026, 1028, 1030, 1032, 1034, 1036 and 1038 are rendered conductive. The triodes 1034, 1036 and 1038 are rendered conductive because the "and" networks 964, 982, and 1004 are in their conductive conditions, as will be apparent subsequently.

The conductivity of the triode 1026 causes an energizing current to flow through the winding of the solenoid 615 so that the stack head 601 is retracted to allow the cards 510 from the card holder 512 to be fed in a one-by-one sequence to the periphery of the drum 521. The conductivity of the triode 1028 causes the solenoid valve 674 to open so that the transfer member 672 emits streams of air. These streams cause the cards from the card holder 512 to enter the gate transfer mechanism 670 and to be transferred by that mechanism to the drum 516, in the manner described above.

The cards 510 are successively transported by the drum 516 past the transducer means 900. This causes the individual transducer heads 902, 904, 906 and 908 of FIGURE 8a to generate a series of pulses. These pulses initiate certain control effects which will be described.

The conductivity of the triode 1030 causes the solenoid valve 680 associated with the transfer member 678 to open, so that the member 678 emits streams of air which force the cards into the gate transfer mechanism 676. Therefore, after the cards 510 from the card holder 512 have been transported past the transducer means 900 to initiate the control effects referred to above, such cards are returned by the gate mechanism 676 to the periphery of the drum 521.

The conductivity of the triode 1032 causes the winding of the solenoid valve 736 to be energized so that the transfer member 732 produces a stream of air. Therefore, the cards returned to the drum 521 are transferred in sequence by the transfer member 732 to the periphery of the drum 522.

In brief, therefore, during this first pass, the cards 510 from the card holder 512 are fed to the drum 521, and they are then transferred to the drum 516 for processing by the transducer means 900. After such processing, the cards are returned to the drum 521, and they are then transferred to the drum 522.

The cards on the periphery of the drum 522 travel around the drum and approach the transfer member 740. If the member 740 is not activated, the cards are deposited in the card holder 650, the stack head 652 being in its operative position. Alternately, if the member 740 is activated, the cards are transferred to the drum 523 by the resulting streams of air emitted by that lifter. The transferred cards are carried by the drum 523 to the transfer member 748. If the member 748 is not energized, the cards are carried to the card holder 656 and are deposited in that card holder, the stack head 660 being in its operative position. Alternately, if the member 748 is activated, the cards are transferred to the drum 524 and are carried by that drum to the transfer member 754. If the transfer member 754 is not activated, the cards are deposited in the card holder 658, the stack head 664 being in its operative position. However, if the member 754 is activated, the cards are transferred to the next drum and so on.

In a manner to be described, the transfer members 740, 748, and 754 are selectively activated in accordance with the decimal equivalent represented by each card at a selected position on the card. This is so that all the "1's" may be deposited in the card holder 650, all the "2's" in the card holder 656, and all the "3's" in the card holder 658, and so on. This is accomplished in a manner that will now be described.

Now, as the cards 510 pass the transducer means 900 in succession, their various rows are scanned by the transducer heads 902, 904, 906 and 908 which make up this transducer means. The head 902 reads the clock pulses recorded on the lower row of the cards, and these clock pulses are amplified by the amplifier 910 and are used to trigger the flip-flop 918. The delay line 926 returns the flip-flop 918 to its initial condition between successive ones of these pulses, as noted, so that the flip-flop may be successively triggered by the pulses. The flip-flop 918, therefore, feeds pulses to the binary counter 942. In the described manner, the compare network 948 generates a pulse corresponding to the selected position on each card, and a pulse is developed on the lead 950 at the end of each card, that is at the completion of processing of each card.

As the cards pass the transducer heads 904, 906 and 908, the amplifiers 912, 914 and 916 produce pulses which trigger the flip-flops 920, 922 and 924. These flip-flops assume operational states for each position of the card being processed which correspond to the binary number recorded at that position. The translator 934, therefore, produces a pulse at the one of its output terminals which corresponds to the decimal equivalent of the data recorded at the successive positions on the card being processed. These pulses are introduced to the corresponding "and" networks 936, 938 and 940. However, these "and" networks are conditioned for translation by the compare network 948 only at the selected position of the card being processed. Therefore, one of the flip-flops 952, 966 and 984 is triggered to its true state, this being determined by the particular decimal equivalent represented by the magnetic information at the selected position of the card being processed.

Assume that the first card to be processed has magnetic information representing the decimal equivalent "1" at the selected position on the card, which selected position is determined by the control of the selector 944. Then, when the first card is processed, the flip-flop 952 will be triggered to a true state when the selected position of that card reaches the transducer means 900. The triggering of the flip-flop 952 to a true state conditions the "and" network 954 for translation. The "and" network 954, subsequently translates a pulse to the left input terminal of the flip-flop 956 at the completion of scanning of the first card 510, and when a pulse appears on the lead 950. The output pulse from the "and" network 954 also returns the flip-flop 952 to a false state so that it may be prepared for the next card to be processed.

The trigegring of the flip-flop 956 to its true state conditions the "and" network 958 for translation. However, no pulse is translated by this "and" network 958 until the next succeeding card is processed by the transducer means 900, and only after such processing has been completed so that a second pulse apepars on the lead 950. This gives the first card a chance to be transferred back to the drum 521 and to the drum 522.

The resulting output pulse from the "and" network 958 returns the flip-flop 956 to its false state to prepare it for the next card, and this output pulse also triggers the flip-flop 960 to its true state. The triggering of the flip-flop 960 to a true state causes the "and" network 964 (FIGURE 8b) to be nonconductive so that the triode 1034 becomes non-conductive. The solenoid valve 744 is de-energized, therefore, and this valve closes to cut off the air pressure at the transfer member 740. This occurs just as the first card is transported on the drum 522 toward the member 740. This first card, therefore, passes the member 740 and is deposited in the card holder 650. This is desired because it was assumed that the first card represented the decimal equivalent "1" at its selected position, and such cards were to be deposited in the card holder 650.

The triggering of the flip-flop 960 to a true state also causes that flip-flop to render the "and" network 962 conductive. Then, and when the processing of the third card has been completed, the next succeeding pulse on the lead 950 returns the flip-flop 960 to its false state. This places the flip-flop 960 in a prepared condition for the succeeding card, and also causes the "and" network 964 again to become conductive. Therefore, air pressure is again established at the transfer member 740, after the first card has safely passed the member and has been deposited in the card holder 650.

Assume now that the second card to be processed represents the decimal equivalent "2" at its selected position. Therefore, the output terminal No. 2 of the translator 934 will develop a pulse at the selected position of the second card, and the "and" network 938 will be conditioned for translation at this precise moment by the output pulse from the compare network 948. Therefore, the flip-flop 966 is triggered to a true state by the second card. The flip-flop 966 now places the "and" network 968 in condition for translation, and at the completion of processing of this second card, the resulting pulse on the lead 950 is passed through the "and" network 968 to trigger the flip-flop 970 to its true state and to return the flip-flop 966 to a false state. In a manner similar to that described above, the pulse on the lead 950 from the third card causes the flip-flop 974 to be triggered to a true state and the flip-flop 970 to be returned to a false state. The triggering of the flip-flop 978 causes the "and" network 982 of FIGURE 8b to lose its conductivity, and this causes the triode 1036 to become non-conductive so that the solenoid valve 752 is deenergized to cut off the air pressure from the transfer member 748.

It will be remembered that the above control is effectuated by the third card after the card being processed. This gives the card being processed sufficient time to return to the drum 521 and to be transferred to the drum 522. Because of this and because the pressure at the member 740 is not terminated, this card is transferred to the drum 523. The termination of the air pressure from the member 748 as described above occurs as the second card approaches this member. Therefore, the second card is deposited in the card holder 656. This is desired because it was assumed that the second card represented the decimal equivalent 2 at its selected position, and all the 2's are to be deposited in the card holder 656. After the card in question has passed the lifter 748, a subsequent card on the completion of its processing develops a pulse on the lead 950 to return the flip-flop 978 to its false state.

Assuming now that the third card to be processed represents the decimal equivalent 3 at its selected position. In like manner, this card causes the flip-flop 984 to be triggered to a true state, and upon the completion of processing of this third card, the flip-flop 988 is triggered to a true state and the flip-flop 984 returned to a false state. Then, the completion of processing of the fourth card causes the flip-flop 992 to be triggered to a true state and the flip-flop 988 to be returned to a false state. The completion of processing of the fifth card causes the flip-flop 996 to be triggered to a true state and the flip-flop 992 to be returned to a false state. Finally, the completion of processing of the sixth card causes the flip-flop 1000 to be triggered to a true state and the flip-flop 996 to be returned to a false state.

The above triggering of the flip-flop 1000 causes the "and" network 1004 to lose its conductivity and cut off the air pressure to the transfer member 754. This is timed to occur when the third card reaches the drum 524 and is being transported by the drum to the card holder 658. Therefore, this card is moved past the member 754 before the flip-flop 1000 is returned to a false state, and the card is deposited in the card holder 658. This is proper because it was desired that all the cards representing the decimal equivalent "3" at the selected position be deposited in this card holder.

Therefore, in the described manner, all the cards 510 from the card holder 512 are fed out to the card holders 650, 656 and 658; and such cards are deposited in the latter card holders in accordance with the decimal equivalent of the digital data recorded at the selected position of each card.

During the initial pass described above, the other independent stack of cards 511 remains in the card holder 513 and the card holders 630, 636 and 642 are all empty. Therefore, the switch 1198 is closed. When the last card 510 leaves the card holder 512 in the sorting operation described above, the armature of the switch 1200 closes on its lower fixed contact. Because the switch 1198 is closed, this completes a circuit to the positive terminal of the source 1012 and in the manner described above, the differentiator 1204 is caused to develop an output pulse. This pulse is delayed in the delay line 1208 a sufficient time to allow the last card to reach the appropriate one of the card holders 650, 656 and 658. Then, the flip-flop 1024 is triggered to its false state. This triggering of the flip-flop 1024 causes the triodes 1026, 1028, 1030, 1032, 1034, 1036 and 1038 all to become nonconductive. Therefore, the card holder 512 is transformed to a stacking station because the solenoid 615 is de-energized and its stack head 601 moves forward into an operative position. Also, the air pressure is cut off from the transfer members 672 and 678 and from the transfer members 732, 740, 748 and 754.

The triggering of the flip-flop 1024 to its false state causes the triodes 1068, 1070, 1072 and 1074 to become conductive. The conductivity of the triode 1068 causes the energizing winding of the solenoid valve 734 to be energized so that the transfer member 730 is activated. In like manner, the conductivity of the triode 1070 causes the member 738 to be activated and the conductivity of the triode 1072 causes the member 746 to be activated.

The conductivity of the triode 1074 energizes the winding of the solenoid 652 so that the stack head 652 of the card holder 650 is withdrawn to a standby position. This causes the cards in the card holder 650 to be fed sequentially to the periphery of the drum 522. Due to the fact that the transfer member 730 is activated, these cards are returned to the drum 521 and are transported by that drum back to the card holder 512. As noted above, this card holder 512 is in its stacking condition, so that these cards are deposited one after the other in the card holder 512.

As the last card leaves the card holder 650, the switch 1076 closes. This causes the triode 1080 to become conductive to energize the solenoid 662 associated with the card holder 656. The energizing of this solenoid causes it to retract the stack head 660 to its standby position. The cards in the card holder 656 are now fed sequentially to the drum 523, and they are transported by the drum to the transfer member 738. This member 738 is activated, as noted above, so that the cards are transferred to the drum 522. The cards are transported on the drum 522 past the card holder 650 which is now in its feeding condition, and to the transfer member 730. Due to the fact that the latter member is activated, these cards are returned to the drum 521 to be deposited one after the other in the card holder 512.

As the last card leaves the card holder 656 the switch 1078 closes. This causes the triode 1082 to become conductive, so that the winding in the solenoid 666 is energized. This solenoid retracts the stack head 664 to cause the cards in the card holder 658 to be fed in a one-by-one sequence to the periphery of the drum 524. These cards are then transferred to the drum 523 by the activated member 746, and they are then transferred to the drum 522 by the member 738 and returned to the drum 521 by the member 730. These latter cards are then deposited one after the other in the card holder 512.

Therefore, the cards 510 in the card holders 650, 656, 658 are all returned in sequential order to the card holder 512, and these cards are stacked in that latter card holder in a sorted position with respect to the binary information at the selected position on each card.

The output pulse from the delay line 1208, which occurs after the switch 1200 closes in response to the last card 510 leaving the card holder 512, is also introduced to the right input terminal of the flip-flop 1114. This pulse triggers the flip-flop 1114 to its false state, and it causes that flip-flop to render the triodes 1156, 1158, 1160, 1162, 1164, 1166 and 1168 conductive. Therefore, while the cards 510 are in the process of being returned to the card holder 512, the system is controlled to process the cards 511 in the card holder 513.

The conductivity of the triode 1156 causes the solenoid 614 to retract the stack head 609 so that the cards 511 may be fed from the card holder 513 to the drum 517. The conductivity of the triode 1158 causes the transfer member 690 to be activated, and the conductivity of the triode 1160 causes the transfer member 684 to be activated. Therefore, the cards 511 from the card holder 513 are transported by the drum 517, and these cards are transferred to the common drum 516 for processing by the common transducer means 900. These cards are then returned to the drum 517 by the gate transfer mechanism 682.

The conductivity of the triode 1162 causes the lifter 700 to be activated so the cards 511 may now be transferred to the drum 518. In a manner similar to that described in conjunction with the cards 510 from the card holder 512; control pulses from the translator 934 selectively interrupt the conductivity of the "and" networks 1006, 1008 and 1010 in FIGURE 8b. These latter interruptions in turn control the conductivity of the triodes 1164, 1166 and 1168 so as to obtain controlled activations of the members 708, 716 and 724 in FIGURE 7.

In this manner, the cards 511 from the card holder 513 are deposited in the card holders 630, 636 and 642 in accordance with the particular binary number represented at a selected position of each of these cards.

Now as the last card 511 leaves the card holder 513, and all the cards 510 have been returned to the card holder 512 so that the card holder 658 is empty and the switch 1210 is closed; then the switch 1212 closes and, because the switch 1210 is closed, a circuit is completed to the capacitor 1218 so that the differentiator 1216 develops a pulse. This pulse is delayed by the delay line 1220 for a time sufficient to allow the last card 511 from the card holder 513 to reach the appropriate one of the card holders 630, 636 and 642. Then, this pulse is introduced through the "or" networks 1021 and 1113 to the left input terminals of each of the flip-flops 1024 and 1114.

The flip-flops 1024 and 1114 are now triggered to their true states, and the process described above is repeated. At this time, the selector 944 is changed so that the cards may be sorted in accordance with the binary number at a different position on the cards. While the flip-flop 1024 in its true state is causing the cards 510 from the card holder 512 to be fed to the drum 521 and to be processed in the manner described above, flip-flop 1114 in its true state renders the triodes 1116, 1118, 1120 and 1122 conductive to cause the cards 511 to be returned to the card holder 513 in a manner now to be described.

The conductivity of the triode 1116 causes the member 704 to be activated, the conductivity of the triode 1118 causes the member 710 to be activated, and the conductivity of the triode 1120 causes the member 718 to be activated. Moreover, the conductivity of the triode 1122 causes the solenoid 634 to retract the stack head 632 so that the cards in the card holder 630 may be fed to the drum 518.

Also, due to the fact that the flip-flop 1114 is triggered to its "true" state, the triodes 1156, 1158, 1160, 1162, 1164, 1166, and 1168 are all rendered non-conductive. Therefore, the card holder 513 becomes a stacking station, and the transfer members 690, 684, 700, 708, and 716 are all deactivated. Therefore, the cards 511 from the card holder 630 are transported in succession by the drums back to the card holder 513. When the last card leaves the card holder 630, the switch 1124 closes so that the triode 1128 is rendered conductive. This causes the solenoid 640 to retract the stack head 638 associated with the card holder 636, so that the cards in the card holder 636 may be fed to the drum 519. These latter cards are now sequentially returned to the card holder 513 in the described manner.

Then, when the last card leaves the card holder 636, the switch 1126 closes so that the triode 1130 becomes conductive. This causes the solenoid 646 to move the stack head 644 associated with the card holder 642 to its standby position. Then, the cards from the card holder 642 are fed to the drum 520 to be returned in like manner to the card holder 513. As the last card 511 leaves the card holder 642, the switch 1198 closes to condition the system for the next cycle, and this next cycle begins just as soon as the last card leaves the card holder 510 to close the switch 1200.

These cycles or passes repeat, with the selector 944 being changed for each pass, and the operation continues until the cards in the card holder 512 and the cards in the card holder 513 are completely sorted. The selector 944 is mechanically coupled to the contacts 1211 to open these contacts and terminate the cycles at the completion of sorting.

In somewhat the same manner as in the system of FIGURE 1a, therefore, the apparatus and system of FIGURES 7, 8a and 8b share the common drum 516 and the common control system associated with the transducer means 900. The system proceeds to operate with the cards 510 in the card holder 512 being processed while the cards 511 are being returned to the card holder 513 and vice versa.

As indicated above, it is usual for each of the information storage cards to contain blocks of data in which each column in a group of positions, for example, represents numerical or other information at levels of different ordinal significance. For example, when numerical information is represented in the particular block on each card, the first column would represent the digit of least significance, the second column would represent the digit of the next least significance etc. In order to sort the cards in the mechanism of the invention, and as mentioned above, the cards are processed in a first pass in which the selector 944 of FIGURE 8a is positioned to cause the column of the least significant digit to be sensed for each card. The cards are then sorted as described above in accordance with the decimal equivalents in this column. At the completion of this first pass, a second pass is initiated in which the column of the next least significant digit is sensed and the cards are sorted on the basis of this digit. These passes are continued and the cards are sorted accordingly up to and including the most significant digit in the block. At this time, the switch 1211 of FIGURE 8a is actuated to terminate the operation.

It is, of course, preferable for the shift of the selector 944 from one pass to the next for the operations described above to be under an automatic control. Such an automatic control of the selector can be achieved by the system schematically shown in FIGURE 9.

In FIGURE 9, the binary counter 942 is shown as being composed of a plurality of flip-flops 942a, 942b, 942c and 942d. These flip-flops are connected in known manner to constitute a binary chain. Although four flip-flops are shown, it will be appreciated that as many flip-flops as there are positions on each card should be used.

The selector 944 is shown as composed of a series of switches 944a, 944b, 944c and 944d. These switches each have a pair of input terminals connected respectively to the left and right output terminal of its associated flip-flop. The output terminal of each of the switches is connected to the compare network 948. The switches may be electrically or otherwise controlled so that in one operating condition, the left output terminal of its associated flip-flop is connected to the compare network 948 and in a second operating condition, the other output terminal of its associated flip-flop is connected to the compare network.

The switches are initially controlled by any appropriate manually operated control means to be set to a series of operational states corresponding to the desired position on each card to be sensed in the first pass. It is evident that the switches themselves will constitute a binary chain and each will be set to a first or second condition. Then, only when the operational pattern of the flip-flops which make up the binary counter 942 reaches the pattern to which the switches have been set will the compare network 948 pass an output signal. These operational states correspond, of course, to the desired position of each card to be sensed for each pass.

A second group of flip-flops 1250a, 1250b, 1250c, and 1250d are also interconnected to form a binary counter 1250 identical to the binary counter 942. The right output terminal of each of these latter flip-flops is connected to corresponding ones of the switches 944a, 944b, 944c and 944d to control the operating conditions of the switches. Therefore, whatever may be the initial setting of these switches, each count of the binary counter 1250 will cause the switches to change their operational pattern by one binary step. This, in turn, causes the compare network 948 to develop an output signal at the next adjacent position at each card. The drive for the binary counter 1250 may be obtained from the differentiator 1216 of FIGURE 8a. This differentiator develops an output pulse at the end of each pass so as to obtain an automatic stepping of the binary counter 1250 from one count to the next as each pass is terminated. This causes the next position on the card to be sensed in the next pass.

The output terminals of the flip-flops making up the binary counter 1250 may also be connected to an manually operated selector switch 1252. This selector switch controls, for example, a solenoid 1211' which is mechanically coupled to the switch 1211 of FIGURE 8a. The selector switch can be set so that the solenoid 1211' may be energized after any selected number of columns on each card have been processed in successive passes so as to terminate the operation.

The foregoing discussion of the system of FIGURE 7 has been based on the sorting of two independent groups of cards from the card holders 512 and 513. It is possible, however, to place a single group in one of the card holders for example in the card holder 512. Then, in a first pass, the cards in this card holder are separated so that, for example, the first five decimal equivalents of the most significant digit are placed in the card holder 513 and the second five decimal equivalents of the most significant digit are placed in the card holder 512. Then, the sorting may proceed as before, by depressing the start switches 1014 and 1016 and starting at the least significant digit in the described manner. At the completion of the sorting operations for both groups of cards, however, the entire original group will be sorted. This obtains because the sorted group in one of the card holders will represent the first half of the decimal equivalents at the most significant digit and the cards in the other group will represent the other half.

The operation described above can be carried out by a simple modification of the circuit of FIGURES 8a and 8b. In the modified circuit, as shown in FIGURE 10, the lead "e" from the left output terminal of the flip-flop 1024, instead of being connected directly to the control grid of the triode 1026 is connected to an "or" network 1254, the output terminal of the "or" network being connected to that control grid. A second input terminal of the "or" network 1254 is connected to the armature of a single-pole single-throw switch 1258. The fixed terminal of the switch 1258 is connected to the lead "f" which extends to the right output terminal of the flip-flop 1024, as described.

In like manner, the lead "e", instead of being connected directly to the control grid of the triode 1028 is connected to the input terminal of an "or" network 1256, the output terminal of that "or" network being connected to that control grid. The "or" network 1256 has a second input terminal which is connected to the armature of the switch 1258.

For the first pass, the switch 1258 is closed manually. This switch is also under the control of a switch control solenoid 1262, and the solenoid opens the switch when it is energized. The solenoid is connected to the control grid of the triode 1082 to be energized when the switch 1078 closes.

Also, the lead "d" from the right output terminal of the flip-flop 1114, instead of being connected directly to the control grid of the triode 1156 is connected to the armature of a single-pole single-throw switch 1260. This switch is opened manually for the first pass. The switch 1260 is under the control of a switch solenoid 1264 to be closed when that solenoid is energized. The solenoid 1264 is energized when the switch 1210 of FIGURE 8a closes to represent the last card out of the card holder 658.

Now, the apparatus is initiated as before by closing the switches 1014 and 1016 in FIGURE 8a. As noted, the complete group of cards is placed in the card holder 512, and the selector 944 is adjusted so that the most significant position may be sensed for this first pass. The switch 1258 is closed manually, and the switch 1260 is opened.

Now, the cards proceed as before to be transported from the card holder 512 and to be deposited in the card holders 650, 656, 658 etc. in accordance with the decimal equivalents at the position of the most significant digit.

When all the cards leave the card holder 512, the switch 1200 closes as previously to trigger the flip-flops 1024 and 1114 to their true state so that the cards may be returned. Now, due to the fact that the switch 1258 is closed, the card holder 512 is held in its feeding mode and the gate 670 is activated. Therefore, the returned cards, instead of being deposited in the card holder 512 are carried over to the drum 516. The transfer mechanism 682 is activated in this condition (because the flip-flop 1114 is in its true state) and the cards are carried to the drum 517. Because the switch 1260 is opened, the card holder 513 remains in its stacking mode so that the cards are stacked in the card holder 513.

The above operation continues, for example, with the cards in the holders 650 and 656 being emptied into the card holder 513. However, when the last card leaves the card holder 656, the switch 1078 closes to energize the solenoid 1262 and to open the switch 1258 so that the card holder 512 assumes its stacking condition. Therefore, subsequent cards from the card holder 658 are stacked in the card holder 512. It is obvious, that the division of cards between the card holders 513 and 512 can be controlled merely by selecting the card holder whose switch is to open the switch 1258.

The system now continues to operate in normal manner until all the remaining cards are returned to the card holder 512. Now, the selector is returned to the least significant digit, the start switches 1014 and 1016 are actuated, and the sorting proceeds as before.

The invention provides an improved system, therefore, in which two separate and independent stacks of information storage cards may be handled and processed at essentially the same time on a time-sharing basis. Alternately, a single stack of cards may be sorted by the invention by first causing the system automatically to divide the stack into two groups which are sorted insofar as the most significant digit of the block is concerned.

The invention materially speeds up the handle techniques in the more complex data processing systems. In addition, the apparatus of the invention includes certain components and control systems which are used in common between cards of the two groups. This latter feature provides a material saving in components with a resulting reduction in necessary costs of equipment. It should be appreciated that drums as well as other types of transport means can be used to obtain a movement of the cards on a time-sharing basis as described previously in the specification. It should also be appreciated that the term "cards" as used in the specification and in the claims is intended to include any type of discrete elements capable of storing a plurality of bits of digital information.

As used in the claims, the words "means for processing . . ." are intended to include the electrical circuitry associated with the transducer heads such as the heads 181 and 182 for processing information read by such heads. For example, the words "means for processing . . ." are intended to include the electrical circuitry shown in FIG. 1a and the electrical circuitry shown in FIG. 8a.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use with first and second groups of information storage cards, first input means for the information storage cards in the first group and constructed to provide a transfer of the cards in the first group from the input means at particular times and into the input means at other times, second input means for the information storage cards in the second group and constructed to provide a transfer of the cards in the second group from the input means at particular times and into the input means at other times, receiving means for the cards in the first group from the first input means and for the cards in the second group from the second input means, and means including a common control circuit operative upon the first and second input means for causing the cards in one of the groups to be transferred to the receiving means from the input means holding the cards in that group and for simultaneously causing the cards in the other group to be returned from the receiving means to the other of said input means.

2. In combination, first input means for a first group of information storage cards and constructed to provide a transfer of the cards in the first group from the input means at particular times and to provide a transfer of the cards in the first group to the input means at other times, second input means for a second group of information storage cards and constructed to provide a transfer of the cards in the second group from the second input means at particular times and to provide a transfer of the cards in the second group to the second input means at other times, first receiving means for the cards from the first input means and constructed to provide a transfer of the cards in the first group from the receiving means at particular times and to provide a transfer of the cards in the first group into the receiving means at other times, second receiving means for the cards from the second input means and constructed to provide a transfer of the cards in the second group from the second receiving means at particular times and to provide a transfer of the cards in the second group into the second receiving means at other times, and means including a common control circuit operative upon the first and second input means and the first and second receiving means for causing the cards in each of said groups to be transferred sequentially from the associated one of said input means to the associated one of the receiving means and for simultaneously causing the cards in the other group to be returned from the other receiving means to its associated input means, and transducer means coupled to the cards being transferred from the input means to the associated receiving means for processing particular information on such cards.

3. In combination, first input means for a first group of information storage cards and constructed to obtain a transfer of the cards in the first group from the first input means at particular times and to obtain a transfer of the cards in the first group into the first input means at other times, second input means for a second group of information storage cards and constructed to obtain a transfer of the cards in the second group from the input means at particular times and to obtain a transfer of the cards in the second group into the input means at other times, first receiving means for the cards from the first input means and constructed to obtain a transfer of the cards in the first group into the receiving means at particular times and to obtain a transfer of the cards in the first group from the receiving means at other times, second receiving means for the cards from the second input means and constructed to obtain a transfer of the cards in the second group from the second receiving means at particular times and to obtain a transfer of the cards in the second group into the second receiving means at other times, and means including a common control circuit and including transport means coupled to the first and second input means and to the first and second receiving means for obtaining an operation of the first and second input means and the first and second receiving means to cause the cards in the first group to be transported from said first input means to said first receiving means while causing the cards in the second group to be returned from said second receiving means to said second input means and for causing the cards in the second group to be transported from said second input means to said second receiving means while causing the cards in the first group to be returned from said first receiving means to said first input means.

4. In combination, first input means for a first group of information storage cards and constructed to provide a transfer of the cards in the first group from the first input means at particular times and to provide a transfer of the cards in the first group into the first input means at other times, second input means for a second group of information cards and constructed to provide a transfer of the cards in the second group from the second input means at particular times and to provide a transfer of the cards in the second group into the second input means at other times, first receiving means for the cards in the first group and constructed to provide a transfer of the cards in the first group from the first receiving means at particular times and to provide a transfer of the cards in the first group into the first receiving means at other times, second receiving means for the cards in the second group and constructed to provide a transfer of the cards in the second group from the second receiving means at particular times and to provide a transfer of the cards in the second group into the second receiving means at other times, a common transport medium for the cards in the first and second groups and disposed relative to the first and second input means and to the first and second receiving means for obtaining a movement of the cards in the first group between the first input means and the first receiving means and the cards in the second group between the second input means and the second receiving means, and means including a common control circuit coupled to the first and second input means and to the first and second receiving means for obtaining an operation of the input and receiving means in relationships for causing the cards in one of the groups to be transferred from the associated one of said input means to the transport medium for movement to the associated receiving means and for simultaneously causing the cards in the other group to be transferred from the other receiving means to the transport medium for a return movement to the other of said input means.

5. Apparatus for handling at least first and second groups of information storage cards, said apparatus including, first input means for the first group of information storage cards and constructed to obtain a transfer of the cards in the first group from the input means and to obtain a transfer of the cards in the first group to the input means, second input means for the second group of information storage cards and constructed to obtain a transfer of the cards in the second group from the second input means and to obtain a transfer of the cards in the second group to the second input means, a common transport medium disposed relative to the cards in the first and second groups for respectively obtaining a movement of such cards to and from the first input means and to and from the second input means, means including transducing means positioned in cooperative relationship with the cards on said common transport medium for processing information on the transported cards, and control means operatively coupled to the first and second input means and to the first and second receiving means to obtain an operation of such means in relationships for causing the cards of the first group to be transferred to the common transport medium for processing by the transducing means during certain intervals and for causing the cards of the second group to be transferred to the common transport medium for processing by the transducing means during other intervals.

6. Apparatus for handling at least two groups of information storage cards, said apparatus including, first input means for a first group of information storage cards and constructed to obtain a transfer of the cards in the first group from the first input means and to obtain a transfer of the cards in the first group to the first input means, second input means for a second group of information storage cards and constructed to obtain a transfer of the cards in the second group from the second input means and to obtain a transfer of the cards in the second group to the second input means, transporting means coupled to the cards in the first and second groups for obtaining a transfer of the cards in the first group between the transporting means and the first input means and for obtaining a transfer of the cards in the second group between the transporting means and said second input means, first output means coupled to the cards in the first group transferred to said transporting means from said first input means for receiving such transported cards, second output means coupled to the cards in the second group transferred to said transporting means from said second input means for receiving such transported cards, a common transport medium for cards from said first and second input means, means coupled to the cards on the transporting means for obtaining a controlled transfer of cards from said transporting means to said transport medium, and means including transducing means coupled to the cards on the transport medium for processing the cards transferred to the transport medium from the first and second input means and for individually processing the cards transferred to the transport medium from each of said input means relative to the processing of the cards transferred to the transport medium from the other of said input means.

7. Apparatus for handling at least two groups of information storage cards, said apparatus including, first input means for a first group of information storage cards and constructed to obtain a transfer of the cards in the first group from the first input means and to obtain a transfer of the cards in the first group to the first input means, second input means for a second group of information storage cards and constructed to obtain a transfer of the cards in the second group from the second input means and to obtain a transfer of the cards in the second group to the second input means, first transporting means coupled to the cards in the first input means for obtaining a transfer of such cards to the transport means from said first input means, first output means coupled to the cards transferred to said first transporting means from said first input means for receiving such cards, second transporting means coupled to the cards in the second input means for obtaining a transfer of such cards to the second transport means from said second input means, second output means coupled to the cards transferred to said second transporting means from said second input means for receiving such cards, a common transport medium disposed to receive cards transferred to the first and second transporting means from said first and second input means, means coupled to the cards transferred to the first transporting means from the first input means for processing information on such cards and for providing for a transfer of particular ones of such cards from the first transporting means to the common transport medium in accordance with such processed information, means coupled to the cards transferred to the second transport means from the second input means for processing particular information on such cards and for providing a transfer of particular ones of such cards from the second transporting means to the common transport medium in accordance with such processed information, and means coupled to the cards transferred to the common transport medium for providing a further processing of information on such cards.

8. Apparatus for handling at least two groups of information storage cards, said apparatus including, a first card holder for a first group of information storage cards, a second card holder for a second group of information storage cards, means including a first rotatable transporting drum constructed to hold cards in fixed position on its periphery during the drum rotation, a transfer mechanism coupled to the cards in the first card holder for obtaining a controlled transfer of such cards from said first card holder to said first transporting drum, means including a second rotatable transporting drum constructed to hold cards in fixed position on its periphery during the drum rotation, a second transfer mechanism coupled to the cards in the second card holder for obtaining a controlled transfer of such cards from said second card holder to said second transporting drum, means including a common rotatable transporting drum coupled to said first and second transporting drums and constructed to hold cards in fixed position on its periphery during the drum rotation, first means coupled to the cards on the first drum for obtaining a controlled transfer of such cards from said first transporting drum to said common transporting drum, second means coupled to the cards on the second drum for obtaining a controlled transfer of such cards from said second transporting drum to said common transporting drum, means coupled to the first and second transfer means for obtaining a controlled operation of the first transfer means at first particular times and for obtaining a controlled operation of the second transfer means at second particular times different from the first particular times, and means including transducing means coupled to the cards on said common transporting drum for processing particular information on the cards transferred to the common transporting drum from the first and second drums and for individually processing the cards transferred to the common transporting drum from each of the first and second drums relative to the processing of the cards transferred to the common transporting drum from the other of the first and second drums.

9. Apparatus for handling at least two groups of information storage cards, said apparatus including, first input means for a first group of information storage cards and constructed to provide a transfer of the cards in the first group from the first input means at particular times and to provide a transfer of the cards in the first group into the input means at other times, second input means for a second group of information storage cards and constructed to provide a transfer of the cards in the second group from the second input means at particular times and to provide a transfer of the cards in the second group into the input means at other times, first transporting means for the cards, first transfer means coupled to the cards in the first group for obtaining a controlled transfer of such cards from said first input means to the first transporting means and for subsequently providing a return of the cards to said first input means from the first transport means, second transporting means for the cards, second transfer means coupled to the cards in the second group for obtaining a controlled transfer of such cards from said second input means to the second transporting means and for subsequently providing a return of the cards to said second input means from the second transporting means, a common transport medium, means including electrical circuitry operative upon the cards on the first transport means for processing particular information on such cards to obtain a controlled transfer of particular cards in the first group from said first transporting means to said common transport medium in accordance with the processed information, means including electrical circuitry operative upon the cards on the second transporting means for processing particular information on such cards to obtain a controlled transfer of particular cards in the second group from said second transporting means to said common transport medium in accordance with the processed information, means including electrical circuitry coupled to the cards transferred to the common transport medium for processing particular information on such cards and for obtaining a subsequent return to the first transporting means of the cards previousy transferred to the common transport medium from the first transporting means and for obtaining a subsequent return to the second transporting means of the cards previously transferred to the common transport medium from the second transporting means, and means couped to the first and second input means and to the first and second transfer means for obtaining an operation of such means in relationships to obtain a transfer of the cards in one of the first and second groups from the associated one of the first and second input means to the associated one of the first and second transporting means during the time that the cards in the other group are being transferred from the associated transporting means to the associated input means.

10. Apparatus for handling at least two groups of information storage cards, said apparatus including, first input means for a first group of information storage cards and constructed to provide a transfer of the cards in the first group to the first input means at particular times and to provide a transfer of the cards in the first group from the input means at other times, second input means for a second group of information storage cards and constructed to provide a transfer of the cards in the second group from the second input means at particular times and to provide a transfer of the cards in the second group into the second input means at other times, first transporting means for the cards in the first group, first transfer means coupled to the cards in the first group for providing a transfer of such cards to said first transporting means from said first input means and for subsequently providing a return of the cards to said first input means from the first transporting means, second transporting means for the cards in the second group, second transfer means coupled to the cards in the second group for providing a transfer of such cards to said second transporting means from said second input means and for subsequently providing a return of the cards to said second input means from the second transporting means, a common transport medium, third transfer means coupled to the cards on the first and second transporting means for providing a transfer of cards from the first and second transporting means to the common transport medium and for subsequently providing a transfer of the cards from the common transport medium back to the first and second transport means, means including transducing means positioned in cooperative relationship with the cards on said common transport medium for processing particular information on the cards on said common transport medium, and means operatively coupled to the first and second input means and to the first, second and third transfer means for obtaining an operation of such means in relationships to provide an introduction of cards in the first group from said first transporting means to said common transport medium during a transfer of the cards in the second group from said second transporting means to said second input means and to provide for the introduction of cards in the second group from said second transporting means to said common transport medium during a transfer of the cards in the first group from said first transporting means to said first input means and to provide for the transfer of the cards in each of the first and second groups from the associated one of the input means to the associated one of the transporting means during the transfer of the cards in the other group from the associated transporting means to the associated input means.

11. Apparatus for handling at least two groups of information storage cards, said apparatus including, first input means for a first group of information storage cards and constructed to provide a transfer of the cards in the first group from the first input means at particular times and to provide a transfer of the cards in the first group into the first input means at other times, second input means for a second group of information storage cards and constructed to provide a transfer of the cards in the second group from the second input means at particular times and to provide a transfer of the cards in the second group into the second input means at other times, first transporting means for the cards in the first group, means coupled to the cards in the first group for providing a transfer of the cards from said first input means to said first transporting means and for subsequently providing a return of the cards from said first transporting means to said first input means, second transporting means for the cards in the second group, means coupled to the cards in the second group for providing a transfer of the cards from said second input means to said second transporting means and for subsequently providing a return of the cards from said second transporting means to said second input means, a common transport medium for the cards in the first and second groups, means coupled to the transported cards for providing for the transfer of cards from the first and second transporting means to the common transport medium and for the subsequent transfer of the cards back to respective ones of said first and second transporting means, means including transducing means positioned in cooperative relationship with the cards on said common transport medium for processing particular information on the cards on said common transporting medium and for individually processing the cards transferred to the common transport medium from each of the first and second transporting means relative to the processing of the cards transferred to the common transport medium from the other of said first and second transporting means, and means including electrical circuitry coupled to the first and second transfer means and to the first and second input means for obtaining an operation of the input and transfer means in relationships to provide for a transfer of the cards in each of the groups from the associated one of the input means to the associated one of the transporting means during the transfer of the cards in the other group from the associated transporting means to the associated input means and to provide for the introduction of particular cards in the first group from said first transporting means to said common transport medium for processing during a return of the cards in the second group from said second transporting means to said second input means and to provide for the introduction of particular cards in the second group from said second transporting means to said common transport medium for processing during a return of the cards in the first group from said first transporting means to said first input means.

12. Apparatus for handling at least two groups of information storage cards, said apparatus including, a first card holder for a first group of information storage cards, a second card holder for a second group of information storage cards, means including a first rotatable transporting drum constructed to provide a movement of cards with the drum during the drum rotation, means including first transfer means coupled to the cards in the first group for providing a controlled transfer of the cards in the first group from said first card holder to said first drum and for subsequently providing a return of the cards from said first drum to said first card holder, means including a second rotatable transporting drum constructed to provide a movement of cards with the drum during the drum rotation, means including second transfer means coupled to the cards in the second group for providing a controlled transfer of the cards in the second group from said second card holder to said second transporting drum and for subsequently providing a return of the cards from said second drum to said second card holder, means including a common rotatable transporting drum constructed to provide a movement of cards with the drum during the drum rotation, means including transducing means positioned in contiguous relationship with the cards on said common transporting drum for processing particular information on the cards transported by said drum, means including electrical circuitry coupled to the cards on the first drum for processing particular information on the cards transferred to the first drum from the first card holder during a return of the cards in the second group by the second transporting means to the second card holder and for providing for the introduction of particular cards in the first group from the first drum to the common drum for further processing in accordance with the information processed on the cards on the first drum, and means including electrical circuitry coupled to the cards on the second drum for processing particular information on the cards transferred to the second drum from the second card holder during the return of the cards in the first group by the first transporting means to the first card holder and for providing for the introduction of particular cards in the second group to the common drum for further processing in accordance with the information processed on the cards on the second drum.

13. Apparatus for handling at least two groups of information storage cards, said apparatus including, means including a first transporting medium constructed to provide a movement of cards, means including first input means coupled to the cards in a first one of the groups and constructed to provide a transfer of such cards in succession to said first transporting medium for movement and constructed to provide a transfer of the cards in successison from the first transport medium to the first input means, means including a second transporting medium constructed to provide a movement of cards, means including second input means coupled to the cards in the second group and constructed to provide a transfer of the cards in succession to said second transporting medium for movement and to provide a transfer of the cards from the second transport medium to the second input means, means including a common transporting medium constructed to provide a movement of cards transferred to said medium from said first and second transporting media, means including transducing means positioned in coupled relationship with the cards on said common transporting medium for processing particular information on cards on said common transporting medium and for processing the cards transferred to said medium from each of the first and second transporting media relative to the processing of particular information on cards transferred to said common transport medium from said other of said first and second transporting media, means including first gate transfer means coupled to the cards in the first group for providing a controlled transfer of particular cards in the first group from said first transporting medium to said common transporting medium at particular times for processing by said transducing means and for subsequently providing a controlled transfer of the cards from said common transport medium to said first transporting medium, means including second gate transfer means coupled to the cards in the second group for providing a controlled transfer of particular cards in the second group from said second transporting medium to said common transporting medium at other times for processing by said transducing means and for subsequently providing a controlled transfer of such cards from said common transport medium to said second transporting medium, means including first output means coupled to the cards transferred to said first transporting medium from said first input means and constructed to obtain a transfer of the cards in the first group from the first transporting medium into the first output means at particular times and to obtain a transfer of the cards from the first output means to the first transporting medium at other times, and means including second output means coupled to the cards transferred to said second transporting medium from said second input means and constructed to provide a transfer of the cards in the second group from the second transporting medium into the second output means at particular times and to provide a transfer of the cards in the second group from the second output means to the second transporting medium at other times, and means coupled to the first and second input means and to the first and second gate transfer means and to the first and second output means for obtaining an operation of such means in particular relationships to provide a transfer of the cards in each group from the associated input means to the associated output means during the transfer of the cards in the other group from the associated output means to the associated input means.

14. Apparatus for handling at least two groups of information storage cards, said apparatus including, means including a first vacuum pressure rotatable transporting drum constructed to hold cards in fixed position on the periphery of the drum during the drum rotation, a first card holder for cards of a first one of the two groups, means including a first transfer mechanism associated with said first card holder for obtaining a controlled transfer of the cards from the first group in sequence to said first transporting drum and for subsequently obtaining a controlled transfer of the cards of the first group from said first transporting drum to said card holder, means including a second vacuum pressure rotatable transporting drum constructed to hold cards in fixed position on the periphery of the drum during the drum rotation, a second card holder for the cards of the second group, means including a second transfer mechanism associated with said second card holder for obtaining a controlled transfer of the cards of the second group from said second card holder in sequence to said second transporting drum and for subsequently obtaining a controlled transfer of the cards of the second group from said second transporting drum to said second card holder, means including a common rotatable vacuum pressure transporting drum constructed to hold cards of the first and second groups in fixed position on the periphery of the drum during the drum rotation, means including transducer means positioned in cooperative relationship with the cards on said common transporting drum for processing particular information on the cards transported by said common transporting drum, means including electrical circuitry coupled to the first and second transfer mechanisms for obtaining the operation of the mechanisms in relationships to obtain the transfer of cards in each of the groups from the associated input means to the associated transporting drum during the transfer of the cards in the other group from the associated transporting drum to the associated input means, means including first gate transfer means coupled to the electrical circuitry for obtaining a transfer of particular cards in the first group from said first transporting drum to said common transporting drum during a transfer of the cards in the second group from said second transporting drum to said second card holder, and means including second gate transfer means coupled to the electrical circuitry for obtaining a controlled transfer of particular cards in the second group from said second transporting drum to said common transporting drum during a transfer of the cards in the first group from said first transporting drum to said first card holder.

15. Apparatus for handling at least first and second groups of information storage cards, including, a first input stack constructed to hold the first group of information storage cards, a second input stack constructed to hold the second group of information storage cards, transport means for the cards in the first and second groups, means constructed and disposed relative to the cards in the first stack for providing a controlled transfer of the cards in the first group to the transport means from the first input stack, means constructed and disposed relative to the cards in the second group for providing a controlled transfer of the cards in the second group to the transport means from the second input stack, means including transducing means disposed relative to the cards on the transport means for processing particular information on the cards transferred to the transport means from the first and second input stacks and for individually processing the particular information on the cards transferred from each input stack relative to the processing of the particular information on the cards transferred to the transport means from the other input stack, and means responsive to the transfer of the cards from each of the first and second input stacks to the transport means for obtaining a return of such cards to that input stack and for obtaining a transfer of the cards in the other one of the first and second input stacks to the transport means.

16. Apparatus for handling at least first and second groups of information storage cards, including, a first input stack constructed to hold the first group of information storage cards, a second input stack constructed to hold the second group of information storage cards, transport means for the cards, first transfer means constructed and disposed relative to the cards in the first group for providing a controlled transfer of the cards between the first input stack and the transport means, second transfer means constructed and disposed relative to the cards in the second group for providing a controlled transfer of the cards between the second input stack and the transport means, means including electrical circuitry operatively coupled to the first and second transfer means for providing an operation of the transfer means in relationships to obtain a controlled transfer of the cards in each group from the associated one of the input stacks to the transport means on a time-sharing basis relative to the transfer of the cards in the other group from the associated input stack to the transport means and for providing a return from the transport means to the particular input stack of the cards previously transferred from that particular input stack to the transport means and for providing such a transfer during the transfer of the cards from the other input stack to the transport means, and means including electrical circuitry operative upon the cards on the transport means for processing particular information on the cards transferred from the first input stack to the transport means and for processing particular information on the cards transferred from the second input stack to the transport means and for individually processing the particular information on the cards transferred from each input stack to the transport means relative to the processing of the particular information on the cards transferred from the other input stack to the transport means.

17. Apparatus for handling at least first and second groups of information storage cards, including, a first input stack for holding the first group of information storage cards, a second input stack for holding the second group of information storage cards, a first output stack for receiving and holding cards in the first group, a second output stack for receiving and holding cards in the second group, first means including first transport means coupled to the cards in the first group for providing a transfer of such cards between the first input stack and the first output stack, second means including second transport means coupled to the cards in the second group for providing a transfer of such cards between the second input stack and the second output stack, third transport means for the cards in the first and second groups, first control means coupled to the cards on the first transport means for obtaining a controlled transfer of particular cards in the first group from the first transport means to the third transport means, second control means coupled to the cards on the second transport means for obtaining a controlled transfer of particular cards in the second group from the second transport means to the third transport means, means coupled to the first and second transfer means for obtaining a transfer of the cards in each one of the input stacks from the associated input stack to the associated one of the first and second transport means for movement to the associated output stack and for simultaneously obtaining a transfer of the cards in the other group from the associated output stack to the associated one of the first and second transport means for movement to the associated input stack, and means including transducing means disposed in cooperative relationship with the cards on the third transport means for processing particular information on the cards transferred to the third transport means and for individually processing the particular information on the cards transferred to the third transport means from each of the first and second transport means relative to the processing of the particular information on the cards transferred to the third transport means from the other one of the first and second transport means.

18. Apparatus for handling at least first and second groups of information storage cards, including, a first input stack constructed to hold the first group of information storage cards, a second input stack constructed to hold the second group of information storage cards, transport means movable in a closed loop and constructed to carry the cards transferred to the transport means from the first and second input stacks, means coupled to the cards in the first input stack for providing a selective transfer of such cards between the first input stack and the transport means, means coupled to the cards in the second input stack for providing a selective transfer of such cards between the second input stack and the transport means, means including transducing means disposed in coupled relationship to the cards on the transport means for processing particular information on the cards transferred to the transport means from the input stacks and for individually processing the particular information on the cards from each input stack relative to the processing of the particular information on the cards transferred to the transport means from the other input stack, first means coupled to the cards in the first group transferred to the transport means for receiving the cards transferred to the transport means from the first input stack in accordance with the particular information processed on the cards and for subsequently obtaining a transfer of the cards from the receiving means to the transport means, second means coupled to the cards in the second group transferred to the transport means for receiving the cards transferred to the transport means from the second input stack in accordance with the particular information processed on the cards and for subsequently obtaining a return of the cards from the second receiving means to the transport means, and means coupled to the first and second transfer means and to the first and second receiving means for obtaining an operation of the transfer means and the receiving means in particular relationships to provide for a transfer of the cards in each one of the groups from the associated input means to the transport means for movement to the associated receiving means and for simultaneously obtaining a transfer of the cards in the other group from the associated receiving means to the transport means for movement to the associated input means.

19. Apparatus for handling at least first and second groups of information storage cards, including, a first input stack constructed to hold the first group of information storage cards, a second input stack constructed to hold the second group of information storage cards, transport means for the cards in the first and second groups, first means coupled to the cards in the first group for obtaining a controlled transfer of the cards in the first group to the transport means from the first input stack to obtain a transport of the cards, second means coupled to the cards in the second group for obtaining a controlled transfer of the cards to the transport means from the second input stack to obtain a transport of the cards, a first plurality of output stacks each constructed to hold cards, a second plurality of output stacks each constructed to hold cards, means including transducing means coupled to the cards on the transport means for processing particular information on the transported cards, means including electrical circuitry operative upon the cards in the first and second input stacks for obtaining a transfer to the transport means for processing of cards from one of the input stacks and subsequently cards from the other of the input stacks, means including electrical circuitry and first gate transfer means coupled to the cards in the first group on the transport means for obtaining a transfer to particular ones of the output stacks in the first plurality of the cards from the first input stack in accordance with the information processed on the cards, means including electrical circuitry and second gate transfer means coupled to the cards in the second group on the transport means for obtaining a transfer to particular ones of the output stacks in the second plurality of the cards from the second input stack in accordance with the information processed on the cards, third means coupled to the cards in the first group for obtaining a controlled transfer of the cards to the transport means from the first output stack for movement to the first input stack, fourth means coupled to the cards in the second group for obtaining a controlled transfer of the cards from the second input stack to the transport means for movement to the second input stack, and means including electrical circuitry operative upon the first, second, third and fourth means and upon the first and second gate transfer means for obtaining the transfer of the cards in each particular plurality of the output stacks to a corresponding one of the input stacks during the transfer of the cards from the other one of the input stacks to the corresponding plurality of the output stacks.

20. Apparatus for handling at least first and second groups of information storage cards, including, a first input stack constructed to hold the first group of information storage cards, a second input stack constructed to hold the second group of information storage cards, transport means movable in a closed loop and constructed to carry cards transferred to the transport means from the first and second input stacks, a first plurality of output stacks each constructed to receive the cards transferred to the transport means from the first input stack, a second plurality of output stacks each constructed to receive the cards transferred to the transport means from the second input stack, means including first transfer means coupled to the cards in the first group for obtaining a transfer of the cards between the first input stack and the transport means, means including second transfer means coupled to the cards in the second group for obtaining a transfer of the cards between the second input stack and the transport means, means including transducing means disposed in cooperative relationship with the cards on the transport means for processing particular information on the cards transferred to the transport means from the first and second input stacks and for individually processing the particular informations on the cards transferred to the transport means from each of the input stacks relative to the processing of the particular information on the cards transferred to the transport means from the other of the input stacks, means coupled to the processing means for obtaining a transfer of each card in the first group from the transport means to different output stacks in the first plurality in accordance with the information processed on the cards, means coupled to the processing means for obtaining a transfer of each card in the second group from the transport means to different output stacks in the second plurality in accordance with the information processed on the cards, third transfer means coupled to the cards in the first group for obtaining a transfer of such cards between the output stacks in the first plurality and the transport means, fourth transfer means coupled to the cards in the second group for obtaining a transfer of such cards between the output stacks in the second plurality and the transport means, and means coupled to the first, second, third and fourth transfer means for obtaining an operation of the transfer means in relationships to provide for a transfer of the cards in one of the groups from the associated input stack to the transport means for movement to the associated plurality of output stacks during the time that the cards in the other group are being transferred from the associated plurality of output stacks to the transport means for movement to the associated input stack.

21. Apparatus for handling at least first and second independent groups of information storage cards, said apparatus including, a first card holder constructed to hold cards of a first one of the groups, means including a first transporting medium constructed to obtain a movement of the cards from said first card holder, means including first transfer means disposed in coupled relationship to the cards in the first group for obtaining a controlled transfer of cards between the first card holder and the first transporting medium, a first plurality of additional transpoting media disposed in coupled relationship to one another and to said first transporting medium for a transfer of cards between the first transport medium and a particular one of the additional transport media and between successive one of the additional transporting media and constructed to obtain a movement of the cards, first means including a first plurality of card holders disposed relative to the cards on the transporting media in the first plurality to receive cards from the transporting media and constructed to hold cards, means including second transfer means disposed in coupled relationship to the cards in the second group to obtain a controlled transfer of cards between associated ones of said first plurality of additional transporting media and the card holders, means including a first plurality of gate transfer mechanisms disposed in coupled relationship to the cards in the first group to obtain a controlled transfer of cards between said first transport medium and the particular one of the additional transport media and between respective ones of said first plurality of transporting media, a second card holder constructed to hold the cards of the second group, means including a second transporting medium constructed to obtain a movement of the cards from said second card holder, means including third transfer means disposed in coupled relationship to the cards in the second group for obtaining a controlled transfer of cards between the second card holder and the second transporting medium, a second plurality of additional transporting media disposed in coupled relationship to one another and to said second transporting medium for a transfer of cards between the first transport medium and a particular one of the additional transport media and between successive ones of the additional transport media and constructed to obtain a movement of the cards, means including a second plurality of card holders disposed in coupled relationship to the cards in the second group and constructed to hold cards, means including fourth transfer means disposed in coupled relationship to the cards in the second group to obtain a controlled transfer of cards between associated ones of said second plurality of additional transporting media and the card holders in the second plurality, means including a second plurality of gate transfer mechanisms disposed in coupled relationship to the cards in the second group to obtain a controlled transfer of cards between said second transporting medium and the particular one of said second additional transporting media and between respective ones of said second plurality of transporting media, a common transporting medium positioned adjacent said first transporting medium and adjacent said second transporting medium and constructed to obtain a movement of the cards, means including first additional gate transfer means disposed in coupled relationship to the cards in the first group to obtain a controlled transfer of particular ones of such cards between said first transporting medium and said common transporting medium, means including second additional gate transfer means disposed in coupled relationship to the cards in the second group to obtain a controlled transfer of particular ones of such cards between said second transporting medium and said common transporting medium, transducer means positioned in cooperative relationship with the cards on said common transporting medium, electrical circuitry including the transducer means and coupled to the first gate transfer means to obtain a controlled transfer of particular cards in the first group from said first card holder to said common transporting medium for the processing of particular information on the cards and then to said first additional transporting medium and to different ones of said first plurality of card holders in accordance with the processed information, electrical circuitry operative upon the first and third transfer means for causing the particular cards in the first group to be returned to said first card holder after the transfer of the cards to the first plurality of card holders, electrical circuitry including the transducer means and coupled to the second gate transfer means to obtain a controlled transfer of particular cards in the second group from said second card holder to said common transporting medium for the processing of particular information on the cards and then to said second additional transporting medium and to different ones of said second plurality of card holders in accordance with the processed information, electrical circuitry operative upon the second and fourth transfer means for causing the particular cards in the second group to be returned to said second card holder after the transfer of the cards to the second plurality of card holders, means coupled to the first additional gate transfer means for providing for the introduction of the particular cards in the first group from said first transporting medium to said common transporting medium during the return of the particular cards in the second group to said second card holder, and means operative upon the second additional gate transfer means for providing for the introduction of the particular cards in the second group from said second transporting medium to said common transporting medium during the return of the particular cards in the first group to said first card holder.

22. Apparatus for handling at least first and second groups of information storage cards, said apparatus including, a first card holder constructed to hold the cards of a first one of the groups, means including a first rotatable transporting drum constructed to hold the cards from said first card holder for movement with the drum, means including first transfer means disposed relative to the cards in the first group for obtaining a controlled transfer of the cards between the first card holder and the first drum, means including a first plurality of additional rotatable transporting drums disposed relative to said first transporting drum and to one another, means including a first plurality of card holders disposed relative to associated transporting drums in said first plurality to obtain a transfer of cards between such card holders and such drums and constructed to hold cards, means including second transfer means disposed relative to the cards in the first group for obtaining a transfer of such cards between the card holders in the first plurality and the associated drums in the first plurality, means including a first plurality of gate transfer mechanisms disposed relative to the cards in the first group to obtain a controlled transfer of such cards between different transporting drums in said first plurality, a second card holder constructed to hold cards of the second of the groups, means including a second vacuum pressure rotatable transporting drum constructed to hold cards from said second card holder for movement with the drum, means including third transfer means disposed relative to the cards in the second group for obtaining a controlled transfer of such cards between the second drum and the second card holder, means including a second plurality of additional rotatable transporting drums disposed relative to the second transporting drum and to one another to provide a transfer of cards between such drums and constructed to hold cards for movement with the drums, means including a second plurality of card holders disposed relative to associated transporting drums in said second plurality to provide a transfer of cards between such card holders and such drums and constructed to hold cards, means including fourth transfer means constructed and disposed relative to the cards in the second group for obtaining a controlled transfer of the cards between the card holders in the second plurality and the associated drums in the second plurality, means including a second plurality of gate transfer mechanisms constructed and disposed relative to the cards in the second group for obtaining a controlled transfer of such cards between different transporting drums in said second plurality, means including a common rotatable transporting drum positioned adjacent said first and second transporting drums and between such drums and constructed to hold cards for movement with the common drum, means including transducer means positioned in operative relationship with the cards on said common transporting drum for processing particular information on the cards moving with the drum, first control circuitry responsive to the cards in the first group for obtaining a controlled operation of the first and second transfer means and the first plurality of gate transfer mechanisms in relationships to obtain a controlled transfer of cards from said first card holder to different ones of said first plurality of card holders in accordance with the information processed during the movement of the cards with the common drum and to obtain a controlled transfer of the cards in the first group from the card holders in the first plurality to the first card holder in an order related to the disposition of the cards in the card holders of the first plurality, second control circuitry responsive to the cards in the second group for obtaining a controlled operation of the third and fourth transfer means and the second plurality of gate transfer mechanisms in relationships to obtain a controlled transfer of cards from said second card holder to different ones of said second plurality of card holders in accordance with the information processed during the movement of the cards with the common drum and to obtain a controlled transfer of the cards in the second group from the card holders in the second plurality to the second card holder in an order related to the disposition of the cards in the card holders of the second plurality, and means including third control circuitry operatively coupled to the first and second control circuitry to provide a movement of the cards from each particular one of the first and second pluralities of card holders to the associated one of the first and second card holders during the movement of the cards from the other one of the first and second card holders to the other one of the first and second pluralities of card holders.

References Cited in the file of this patent
UNITED STATES PATENTS

| | | |
|---|---|---|
| 2,359,670 | Page | Oct. 3, 1944 |
| 2,752,154 | Nelson | June 26, 1956 |
| 2,795,328 | Tyler | June 11, 1957 |
| 2,842,362 | Hayes et al. | July 8, 1958 |
| 2,883,189 | Wilson | Apr. 21, 1959 |
| 2,905,466 | Azari et al. | Sept. 22, 1959 |

FOREIGN PATENTS

| | | |
|---|---|---|
| 792,109 | Great Britain | Mar. 19, 1958 |

UNITED STATES PATENT OFFICE
CERTIFICATE OF CORRECTION

Patent No. 3,013,658 December 19, 1961

Jerome B. Wiener

It is hereby certified that error appears in the above numbered patent requiring correction and that the said Letters Patent should read as corrected below.

Column 44, line 23, for "couped" read -- coupled --; column 50, line 42, for "input" read -- output --; column 51, lines 38 and 39, for "transpoting" read -- transporting --.

Signed and sealed this 7th day of August 1962.

(SEAL)
Attest:

ERNEST W. SWIDER
Attesting Officer

DAVID L. LADD
Commissioner of Patents